(12) United States Patent
Catthoor et al.

(10) Patent No.: US 10,592,430 B2
(45) Date of Patent: Mar. 17, 2020

(54) MEMORY STRUCTURE COMPRISING SCRATCHPAD MEMORY

(71) Applicants: IMEC VZW, Leuven (BE); Stichting IMEC Nederland, Eindhoven (BE); UNIVERSIDAD COMPLUTENSE DE MADRID, Madrid (ES)

(72) Inventors: Francky Catthoor, Temse (BE); Matthias Hartmann, Kessel-Lo (BE); Jose Ignacio Gomez, Madrid (ES); Christian Tenllado, Madrid (ES); Sotiris Xydis, Athens (GR); Javier Setoain Rodrigo, Madrid (ES); Thomas Papastergiou, Athens (GR); Christos Baloukas, Athens (GR); Anup Kumar Das, Eindhoven (NL); Dimitrios Soudris, Athens (GR)

(73) Assignees: Imec vzw, Leuven (BE); Stitching Imec Nederland, Eindhoven (NL); Universidad Complutense de Madrid, Madrid (ES)

( * ) Notice: Subject to any disclaimer, the term of this patent is extended or adjusted under 35 U.S.C. 154(b) by 36 days.

(21) Appl. No.: 15/726,749

(22) Filed: Oct. 6, 2017

(65) Prior Publication Data
US 2018/0101483 A1  Apr. 12, 2018

(30) Foreign Application Priority Data
Oct. 6, 2016 (EP) .................................. 16192581

(51) Int. Cl.
*G06F 12/00* (2006.01)
*G06F 12/1045* (2016.01)
(Continued)

(52) U.S. Cl.
CPC ...... *G06F 12/1054* (2013.01); *G06F 12/0811* (2013.01); *G06F 12/0897* (2013.01);
(Continued)

(58) Field of Classification Search
None
See application file for complete search history.

(56) References Cited

U.S. PATENT DOCUMENTS 5,307,320 A * 4/1994 Farrer ................. G11C 11/4076
365/230.01
8,996,765 B2 3/2015 Greenfield et al.
(Continued)

FOREIGN PATENT DOCUMENTS

CN 101739358 A 6/2010

OTHER PUBLICATIONS

Park, Soyoung et al, "A Novel Technique to Use Scratchpad Memory for Stack Management," Proceedings of the Conference on Design, Automation and Test in Europe, 2007, 6 pages.
(Continued)

*Primary Examiner* — David Yi
*Assistant Examiner* — Craig S Goldschmidt
(74) *Attorney, Agent, or Firm* — McDonnell Boehnen Hulbert & Berghoff LLP

(57) ABSTRACT

The present disclosure relates to a memory hierarchy for a system-in-package. An example memory hierarchy is connectable to a processor via a memory management unit arranged for translating a virtual address sent by the processor into a physical address. The memory hierarchy has a data cache memory and a memory structure having at least a L1 memory array comprising at least one cluster. The memory structure comprises a first data access controller arranged for managing one or more banks of scratchpad memory of at least one of the clusters of at least the L1
(Continued)

memory array, comprising a data port for receiving at least one physical address and arranged for checking at run-time, for each received physical address, bits of the physical address to see if the physical address is present in the one or more banks of the at least one cluster of at least the L1 memory array.

15 Claims, 14 Drawing Sheets

(51) Int. Cl.

| | | |
|---|---|---|
| *G06F 12/0897* | (2016.01) | |
| *G06F 12/1009* | (2016.01) | |
| *G06F 12/0811* | (2016.01) | |
| *G06F 12/122* | (2016.01) | |
| *G06F 12/128* | (2016.01) | |
| *G06F 12/0864* | (2016.01) | |
| *G06F 12/08* | (2016.01) | |
| *G06F 12/02* | (2006.01) | |

(52) U.S. Cl.
CPC ........ *G06F 12/1009* (2013.01); *G06F 12/122* (2013.01); *G06F 12/128* (2013.01); *G06F 12/023* (2013.01); *G06F 12/08* (2013.01); *G06F 12/0864* (2013.01); *G06F 2212/1016* (2013.01); *G06F 2212/2515* (2013.01); *G06F 2212/283* (2013.01); *G06F 2212/502* (2013.01); *G06F 2212/621* (2013.01); *G06F 2212/652* (2013.01); *Y02D 10/13* (2018.01)

(56) References Cited

U.S. PATENT DOCUMENTS 9,015,689 B2    4/2015  Bai et al.
9,640,250 B1 *  5/2017  Hoff ...................... G11C 15/04
2016/0085526 A1    3/2016  Moritz
2016/0342526 A1 * 11/2016  Chang ................. G06F 12/1063
2018/0004510 A1 *  1/2018  Grochowski ......... G06F 9/3001

OTHER PUBLICATIONS

Udayakumaran, S. et al., "Dynamic Allocation for Scratchpad Memory Using Compile-Time Decisions," ACM Transactions in Embedded Computing Systems, 5(2), 2006, 34 pages.

Dominquez, Angel et al., "Heap Data Allocation to Scratch-Pad Memory in Embedded Systems," J. Embedded Computing, vol. 1, Issue 4, Dec. 2005, 17 pages.

European Search Report, European Patent Application No. 16192581.3, dated May 11, 2017, 11 pages.

Papadopoulos, Lazaros et al., "Run-Time Dynamic Data Type Transformations", ARCS Workshops (ARCS) IEEE, Feb. 28, 2012, pp. 1-7.

Gautheir, Lovic et al., "Implementation of Stack Data Placement and Run Time Management Using a Scratch-Pad Memory for Energy Consumption Reduction of Embedded Applications", IEICE Trans Fundamentals, vol. E94-A, No. 12, Dec. 2011, pp. 2597-2608.

Avissar, Oren et al., "An Optimal Memory Allocation Scheme for Scratch-Pad-Based Embedded Systems", ACM Transactions on Embedded Computing Systems, vol. 1, No. 1, Nov. 2002, pp. 6-26.

Cho, Doosan et al., "Adaptive Scratch Pad Memory Management for Dynamic Behavior of Multimedia Applications", IEEE Transactions on Computer-Aided Designs of Integrated Circuits and Systems, vol. 28, No. 4, Apr. 2009, pp. 554-567.

Xydis, Sotirios et al., "Custom Multi-Threaded Dynamic Memory Management for Multiprocessor System-on-Chip Platforms", ICSAMOS' 2010, pp. 102-109.

Atienza, David et al., "Systematic Dynamic Memory Management Design Methodology for Reduced Memory Footprint", ACM Transactions on Design Automation of Electronic Systems, vol. 11, No. 2, Apr. 2006, pp. 465-489.

Baloukas, Christos et al., "Optimization Methodology of Dynamic Data Structures Based on Genetic Algorithms for Multimedia Embedded Systems", the Journal of Systems and Software, vol. 82, 2009, pp. 590-602.

* cited by examiner

MEMORY STRUCTURE COMPRISING SCRATCHPAD MEMORY

CROSS-REFERENCE TO RELATED APPLICATIONS

The present application is a non-provisional patent application claiming priority to EP Patent Application No. 16192581.3, filed Oct. 6, 2016, the contents of which are hereby incorporated by reference.

FIELD OF THE DISCLOSURE

The present disclosure is generally related to the field of techniques to memory organization for computing platforms.

BACKGROUND

Traditional cache based memory structures are hardware controlled. Although they are quite helpful to increase the speed of an application program, they also have several drawbacks. Cache memories do not always fit into embedded systems as they increase the system size and the energy cost. Due to the fact that e.g. more data than required is transferred and that a tag access and a comparison per access are needed, cache memories are indeed not extremely energy efficient.

Traditionally, cache memory is categorized in "levels" that describe its closeness and accessibility to the microprocessor. Level 1 (L1) cache is extremely fast but relatively small, and is usually embedded in the processor chip (CPU). Level 1 cache typically includes a data memory (DL1) and an Instruction memory (IL1). Level 2 (L2) cache is often more capacious than L1; it may be located on the CPU or on a separate chip or coprocessor with a high-speed alternative system bus interconnecting the cache to the CPU, so as not to be slowed by traffic on the main system bus. Level 3 (L3) cache is typically specialized memory that works to improve the performance of L1 and L2. It can be significantly slower than L1 or L2, but operates usually at double the speed of RAM. In the case of multicore processors, each core may have its own dedicated L1 and L2 cache, but share a common L3 cache. When a memory location is referenced in the L3 cache, it is typically elevated to a higher tier cache.

FIG. 1 illustrates the block based transfers in a cache memory. When looking for a required data word, first cache level L1 is checked (FIG. 1A). If the word is not found, one has a L1 cache miss. A complete data block (i.e. several words) is then fetched from the next cache level. FIG. 1B shows what happens while looking for the required L1 block in the second cache level. If the block is not present, there is again a L2 cache miss. A complete L2 block (several words) is then fetched from the next level, i.e. the main memory. FIG. 1C finally shows how the L2 miss is first solved and next the L1 miss and how the word is eventually delivered.

FIG. 2 shows the main blocks of a n-way associative cache. When a new address (of x bits) is presented to the cache controller, the m central bits are used to determine which set of blocks of the cache must be checked. Every tag associated to each block of the set is read and driven to a comparator (there will be n tags per set in a n-way associative cache). Each of the read tags are compared with the x-m-k most significant bits of the address. If one (at most one) of the comparisons returns true, the access is a cache hit. The data block associated with the successful tag is read and the required word (selected by the k lowest significant bits) is sent to the upper layer (maybe the CPU). If none of tag comparisons succeeded, the access is a cache miss and the request is forwarded to the next level of the hierarchy.

ScratchPad Memories (SPMs) have been proposed. Scratchpad memory generally refers to a class of high-speed local memory typically used for temporary storage of data during application execution. SPMs have several features. Like caches, scratchpad memories comprise small, fast SRAM, but the main difference is that SPMs are directly and explicitly managed at the software level, either by the developer or by the compiler, whereas caches require extra dedicated circuits. Hence, SPMs are software controlled on-chip memory and do not include additional hardware logic for managing their content. Compared to cache, SPM requires up to 40% less energy and 34% less area. Additionally, SPM cost is lower and its software management makes it more predictable, which is a desirable feature for real-time systems.

Scratchpad memories are commonly encountered in processors in embedded systems as an alternative or supplement to caches (e.g. in Nvidia GPUs). Data are commonly transferred between scratchpad locations and main memory using direct memory access (DMA) instructions, in contrast to being copied, as in the hardware coherence strategies of most caches. Only the data is kept while tag arrays and block-wise transfers are removed. It is up to the user or operating system to decide which data should be placed in the SPM and when they are to be transferred.

Data management at cache level is traditionally called the stack. The stack contains small data which is frequently exchanged with the processor. The stack is mainly required to enable function or procedure calls (and nesting of calls). Register spilling (i.e. copying register values to the stack) is also one of the roles of the stack.

Recently, a wide variety of approaches for software data management of the stack in a scratchpad memory complementary to the data cache has been proposed. The exploration space can be categorized according to five criteria: granularity, the amount of stack in SPM, the placement decision, stack migration and hardware support. These options are described in more detail below.

Various levels of granularity are possible.

Every local variable may be allocated in the SPM or main memory.

Stack frames are somehow partitioned (not at the variable level) and each part may be independently allocated to the SPM.

An allocation per stack frame is performed. At a given time, one stack frame is either in the SPM or in the main memory.

Allocation is done per fixed slot (a page, for example). One slot may contain more than a stack frame. A stack frame can be in more than one slot.

An allocation decision is taken on several stack frames at a time. The complete set is either in the SPM or in the main memory.

The second criterion relates to the amount of stack in the SPM. In one option, 100% of the stack accesses are to the SPM; the current stack frame resides in the SPM. Alternatively, some stack frames never can be in the SPM.

The stack placement decision can be fully static, whereby the analysis and decisions are taken at compile time and nothing is left to runtime. Alternatively, the placement decision can be fully dynamic, whereby both, the analysis and actual placement decision is performed at run time. As a third option, a hybrid scheme could be implemented where most analysis is done at compile or design time (i.e. any phase before execution), but the actual placement decision (if any) is taken at run time using both design-time and run-time information.

Stack migration can either be allowed or not. If it is not allowed, an allocation unit is not copied back to the main memory, once it is placed in the SPM. In case stack migration is allowed, a stack frame (e.g. a stack frame of a parent function) can be created in the SPM and later copied to the main memory to create room for other stack frames (e.g. stack frames of the child functions). Later, when coming back to the parent function, the stack frame could be transferred back to SPM (or not).

Finally, in terms of hardware support, a pure software approach is an option, whereby at compile time, code is inserted/linked which enforces the placement decisions, so that hardware support may not be required. Another option is that no code (source or binary) modification is performed, nor libraries linked. This can be middleware enabled (the operating system or similar interact with custom hardware to decide/enforce decisions) or purely hardware. In a hybrid solution, part of the code inserted/linked may rely on specific hardware (from DMA to some other specialized devices).

U.S. Pat. No. 8,996,765 B2 relates to the management of workload memory allocation. A workload manager identifies a primary and a secondary memory associated with a platform. The secondary memory has performance metrics different from performance metrics of the first memory. A workload controller identifies access metrics associated with a set of data elements invoked by a workload during execution of the platform. A data element performance calculator prioritizes a list of the data elements based on the access metrics associated with corresponding data elements. A memory manager reallocates a first data element of the set from the first memory to the secondary memory based on the priority of that first data element.

U.S. Pat. No. 9,015,689 B2 discloses a stack data management for software managed multicore-processors. Stack data management calls are inserted into software in accordance with an integer linear programming formulation and a smart stack data management heuristic. The calls may be inserted in an automated fashion by a compiler utilizing an optimized stack data management runtime library.

In "*A novel technique to use scratchpad memory for stack management*" (Soyoung Park et al, DATE 2007, pp. 1478-1483), the authors propose a circular buffer management of the stack into the SPM but entirely HW controlled, by using the Memory Management Unit (MMU). The stack virtual space is split into pages. The stack frame holding the top of the stack is always mapped to the SPM. Pages above the SPM virtual area are mapped as invalid, such that when the program tries to read/write from them, an exception happens. In the exception handler, some backup copies (frames from SPM to main memory) could happen to make room for the required stack variables. This technique has a granularity whereby the allocation decision is taken on several stack frames at a time. All stack accesses go to the SPM, stack migration is allowed and there are no code modifications nor linked libraries. The solution is entirely in hardware. The handling of pointer-to-stack problems is transparent (virtual address never changes). All stack frames are allocated to SPM, while this may likely not be optimal for the first levels of the call graph, as the main memory SPM traffic increases due to copies. The size of the slot may be limited by the architecture minimal virtual memory page size. They assert 1 kByte slots are used for the stack by using 1 kbyte pages for the stack region. This is not possible in ARM processors without (significant) MMU modifications.

In the paper "*Implementation of Stack Data Placement and Run Time Management Using a ScratchPad Memory for Energy Consumption Reduction of Embedded Applications*" (Lovic Gauthier et al, IEICE Transactions 94-A(12), pp. 2597-2608, 2011), a compiler controlled strategy to place certain stack frames (or part of them) in a scratchpad memory the data cache is adopted. An Integer Linear Programming (ILP) formulation is developed to decide which frames (or parts thereof) are to reside in the SPM. A given stack frame may reside in the SPM for certain invocations and elsewhere in the memory organization for others. The allocation of the stack frames is controlled by a management code inserted before/after the function call. This approach comes with a performance penalty due to the execution of the inserted management code. Furthermore, there is almost no energy gain from moving stack frames at run time (compared with a fixed stack allocation).

A research group at the University of Maryland has published several papers on scratchpad exploitation. In "*An optimal memory allocation scheme for scratch-pad based embedded systems*" (O. Avissar et al., ACM Trans. Embedded Comput. Syst. 1(1), pp. 6-26, 2002), the placement of global and stack variables in the SPM is performed based on their frequency-per-byte (FPB), obtained by source code profiling. A distributed stack with two explicit stack pointers (one for main memory and the other for SPM) is maintained. The paper "*Dynamic allocation for scratchpad memory using compile-time decisions*" (S. Udayakumaran et al., ACM Trans. Embedded Comput. Syst. 5(2), pp. 472-511, 2006) addresses the placement of global variables, stack variables and code into SPM. The program is divided into regions (namely: functions, loops and if conditions) and potential transfers will be included at the entry and exit points of the regions. Program profiling is used to gather variable usage information per region. The SPM contents can only change in the boundary of two regions (it remains constant during region execution). The approaches of these two papers are very flexible (with variable granularity), however they require a compiler.

Apart from stack data management, there is heap data management. Heap objects are allocated in programs by dynamic memory allocation routines, such as malloc in C and new in Java. They are often used to store dynamic data structures such as linked lists, trees and graphs in programs. Many compiler techniques for heap analysis group allocate all heap objects at a single site into a single heap 'variable'. Additional techniques such as shape analysis have aimed to identify logical heap structures, such as trees. Finally, in languages with pointers, pointer analysis is able to find all possible heap variables that a particular memory reference can access. Heap data is in general difficult to allocate in scratchpad memory. Heap variables usually have an unknown size at compile time, which makes it difficult to guarantee at compile time that they will fit into the scratchpad memory. Further, moving data at runtime (as is required for any dynamic allocation to scratchpad) usually leads to the invalid pointer problem if the moved data is a heap object. Static methods avoid this problem, but obviously lack the benefits of dynamic methods.

The paper "*Heap data allocation to scratch-pad memory in embedded systems*" (Dominguez et al., J. Embedded Computing, Vol. 1, Issue 4, December 2005, pp. 521-540) discusses compile-time methods for allocating heap data to SPM. The proposed approach has similarities with their compile-time method for global and stack data placement to SPM. It allows for dynamic movement of heap data in and out of the SPM to better adhere to the program's behavior. Also, it does not need any additional instructions for the address translation per memory access and it avoids extra tags. Source code information is needed. The program is partitioned into regions (based on loops, start/end of procedures etc.) and then an analysis is performed to find the time order of regions. The compiler is used to insert code that copy portions of the heap in the SPM at the start of each region. The size (and the variables that are copied) is determined by a cost model and information gained through profiling about the frequency of accesses per region.

The paper "*Adaptive Scratchpad Memory Management for Dynamic Behavior of Multimedia Applications*" (Cho et al, IEEE Trans. Computer-Aided Design of Integrated Circuits and Systems, vol. 28, issue 4, pp. 554-567, 2009) tackles the issue of data reusability for applications. It is based on hardware-software cooperation. A profiling is performed to find the most heavily used addresses. The hardware component is a data access record table (DART) that records the runtime memory access history in order to support runtime decisions concerning which regions of data block to place onto the SPM. These memory locations (WML) are placed in the SPM. Different data layouts are created based on the different input sets and a layout is selected. During runtime the selected layout can change thanks to the hardware component (DART). The analysis to extract the layout is more complex by calculating iteration vectors based on the loop iteration number where the regions are accessed.

Hence, there is a need for an energy efficient on-chip memory hierarchy for a system-in-package allowing flexible data allocation across the memory hierarchy.

SUMMARY

It is an object of embodiments of the present disclosure to provide for a memory organization for a memory hierarchy capable of deciding which data to allocate.

The above objective is accomplished by example embodiments according to the present disclosure.

In a first aspect, the disclosure relates to a memory hierarchy for a system-in-package, the memory hierarchy being directly connectable to a processor with at least one processing core via a memory management unit arranged for translating a virtual address sent by the processor into a physical address, the memory hierarchy having a data cache memory and a memory structure, the memory structure having at least a level 1, L1, memory array comprising at least one cluster having one or more banks of scratchpad memory. The memory hierarchy comprises a first data access controller arranged for managing one or more of the banks of scratchpad memory of at least one of the clusters of at least the L1 memory array, comprising a data port for receiving at least one physical address and arranged for checking at run time, for each received physical address, bits of the physical address to see if the physical address is present in the one or more banks of the at least one cluster of at least the L1 memory structure and, if so, as a part of that managing, for forwarding a data request to one or more banks of scratchpad memory where the physical address is required, and if not, for forwarding the physical address to a cache controller steering the data cache memory.

The proposed methods and systems allow for determining which stack frames to allocate to the scratchpad memory. By providing a data access controller, a software controlled approach is possible whereby it is checked if a physical address coming from the memory management unit is available somewhere in one of the clusters of the L1 memory structure and for forwarding a data request in case it is, and for forwarding that address to a cache controller otherwise.

In an example embodiment the L1 memory structure comprises a plurality of clusters.

In an example embodiment the memory structure further comprises a level 2, L2, memory array comprising at least one cluster having one or more banks of scratchpad memory. In an example embodiment the memory structure further comprises a second data access controller arranged for managing one or more of the banks of scratchpad memory of at least one of the clusters of the L2 memory array, comprising a data port for receiving at least one physical address from the first data access controller or the data cache controller and arranged for checking, for each received physical address, if the physical address is present in the one or more banks of the at least one cluster of the L2 memory array and, if so, for forwarding a data request to one or more banks of the L2 memory array where the physical address is required.

In another example embodiment the memory hierarchy further comprises a level 3, L3, memory array comprising at least one cluster having one or more banks of scratchpad memory. In an example, the memory structure comprises a third data access controller arranged for managing one or more of the banks of scratchpad memory of at least one of the clusters of the L3 memory array, comprising a data port for receiving at least one physical address from the second data access controller or the data cache controller and arranged for checking, for each received physical address, if the physical address is present in the one or more banks of the at least one cluster of the L3 memory array and, if so, for forwarding a data request to one or more banks of the L3 memory array where the physical address is required. If the physical address is not found in any of the banks, it can be forwarded to a main memory.

In an embodiment checking at run-time comprises checking to which physical address range the at least one physical address belongs to and checking which of the one or more banks the physical address range belongs to.

The memory arrays are in an example embodiment at least in part integrated into a single memory array.

In an example embodiment, the memory management unit is comprised in the memory hierarchy and arranged for a page allocation strategy with at least two page sizes determined based on at least one page size bit and where deciding on which page size to use is based on the profiling of the object code and binary code by the data access controller, the profiling comprising an analysis of a number of accesses to a stack frame per function invocation, frame size and time between consecutive function calls.

In one embodiment, a functionality of at least the first data access controller is derived from object and binary code information from an application running on the processor having at least one processing core. In one embodiment also a functionality of the memory management unit comprised in the memory hierarchy is derived from the object and binary code information from the application.

In one embodiment, at least two of the data access controllers are integrated into a single data access controller.

In an example embodiment, the memory hierarchy for a system-in-package comprises a heap data controller arranged for performing heap data management by profiling at design time object code of the application running on the processor to obtain profiling information, the profiling information comprising one or more pieces of information on a number of accesses to heap data structures, on allocated sizes, on pointer addresses, on memory footprint or fragmentation, the heap data controller further arranged for identifying and linking data block allocation in the profiling information with dynamic data types in the application, injecting application specific dynamic memory managers at object code level for the dynamic data types.

In an example, the heap data controller is arranged for performing the heap data management at execution time of the application.

In one embodiment, the heap data controller is arranged for performing dynamic data type refinement based on the object code by identifying dynamic data types for the object code and modifying the identified dynamic data types by reallocating elements of the identified dynamic data types.

In another embodiment, the heap data controller is arranged for performing identification and of dynamic data types for the object code and their modification to a functional equivalent but more efficient dynamic data type.

In another embodiment, the heap data controller is arranged for runtime prediction (without utilizing data extracted from design time analysis) of the most frequently accessed data objects, i.e. specific data objects contained in a dynamic data type based on predictive models trained at design time and for using the run-time prediction for reallocating the heap data.

The above and other aspects of the disclosure will be apparent from and elucidated with reference to the embodiment(s) described hereinafter.

BRIEF DESCRIPTION OF THE FIGURES

The above, as well as additional, features will be better understood through the following illustrative and non-limiting detailed description of example embodiments, with reference to the appended drawings. Like reference numerals refer to like elements in the various figures.

DETAILED DESCRIPTION

Figure 1B:
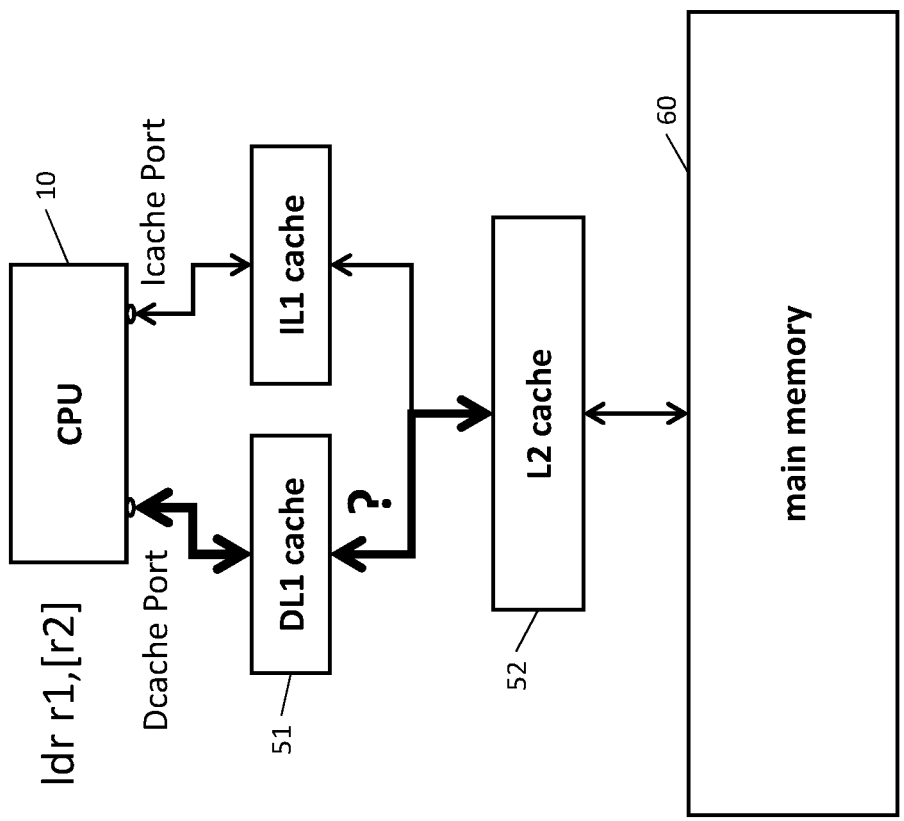
FIGS. 1A, 1B, and 1C illustrate example block based data transfers occurring in a cache memory.
Figure 1A:
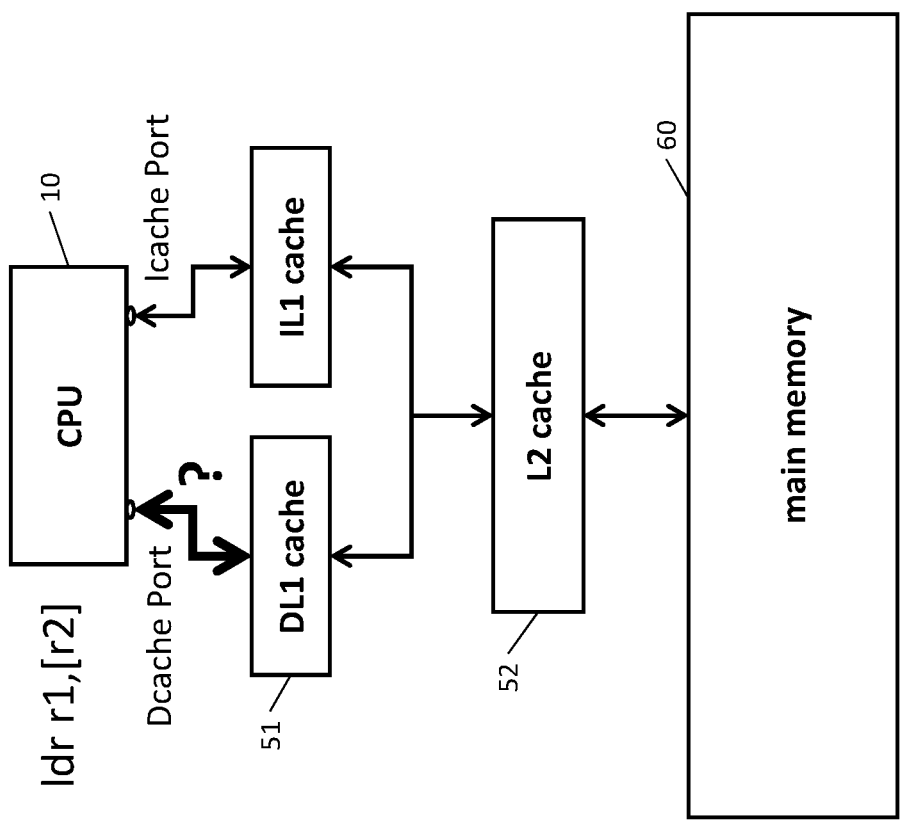
Figure 1C:
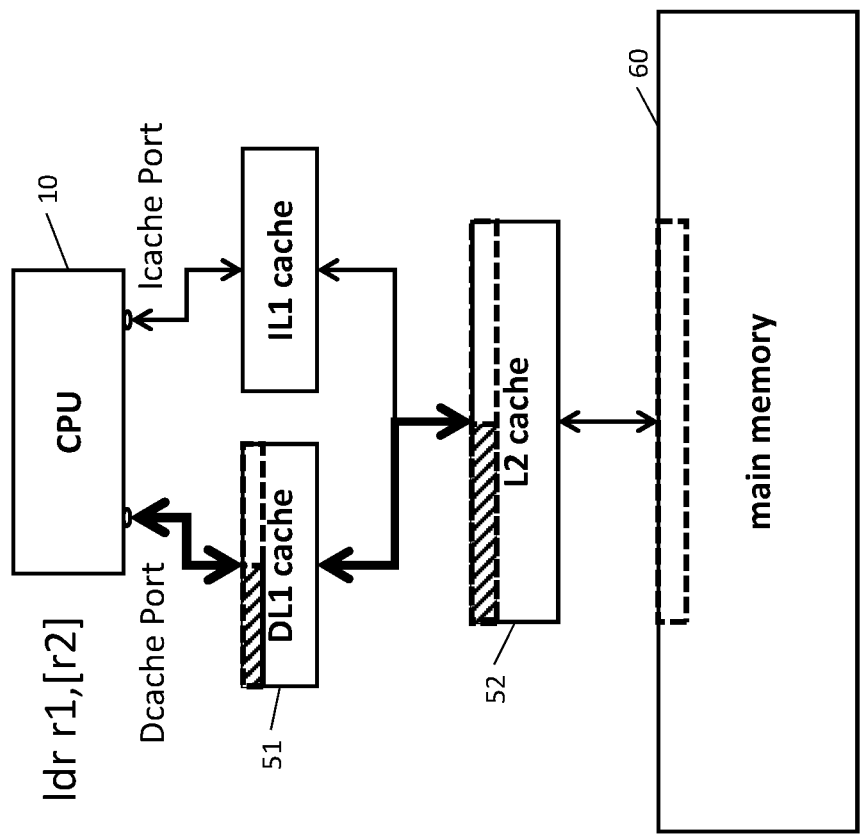
Figure 1C:
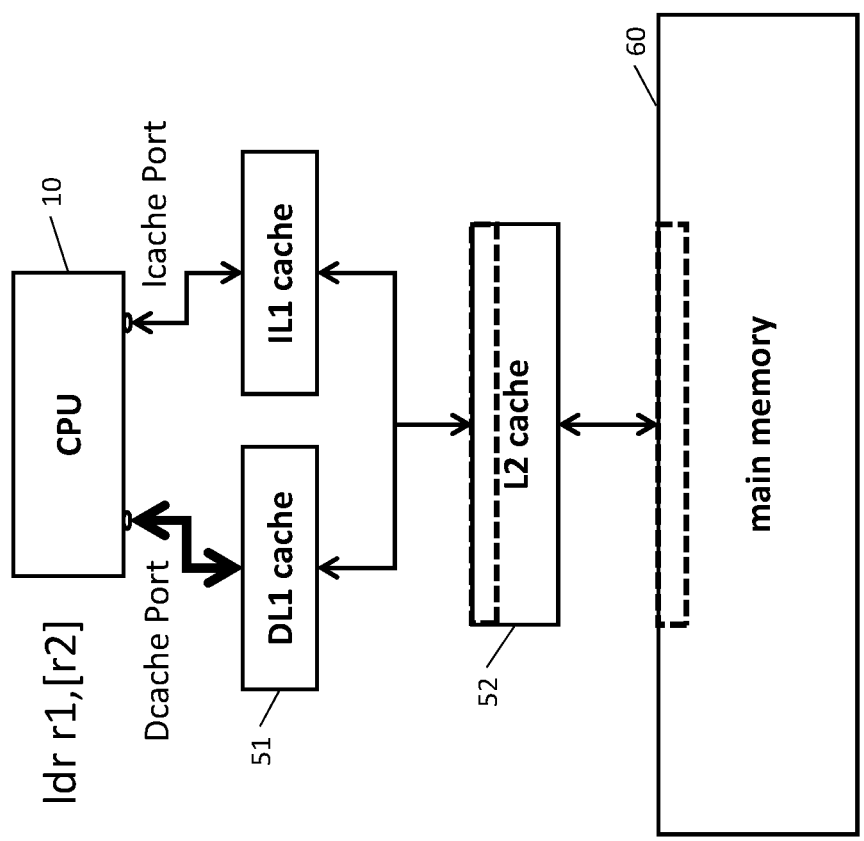
Figure 2:
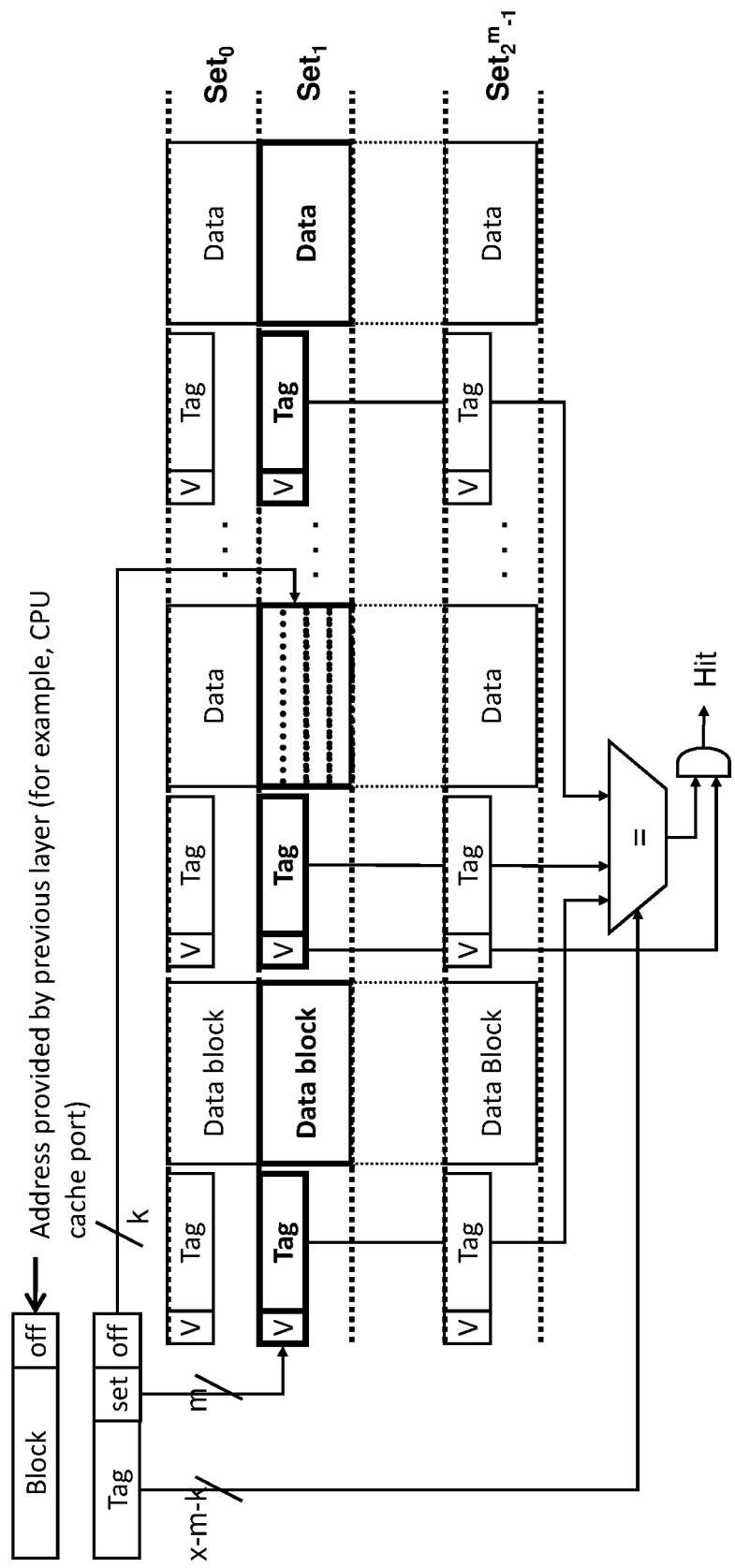
FIG. 2 illustrates an example internal operation of a data cache memory.

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

It is to be noticed that the term "comprising", used in the claims, should not be interpreted as being restricted to the features listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of example embodiments of the disclosure, various features of the disclosure are sometimes grouped together in a single embodiment, figure, or description thereof for the purpose of streamlining the disclosure and aiding in the understanding of one or more of the various aspects of the present disclosure. This method of disclosure, however, is not to be interpreted as reflecting an intention that the claimed disclosure requires more features than are expressly recited in each claim. Rather, as the following claims reflect, example aspects of the present disclosure may lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

It should be noted that the use of particular terminology when describing certain features or aspects of the disclosure should not be taken to imply that the terminology is being re-defined herein to be restricted to include any specific characteristics of the features or aspects of the disclosure with which that terminology is associated.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Figure 3:
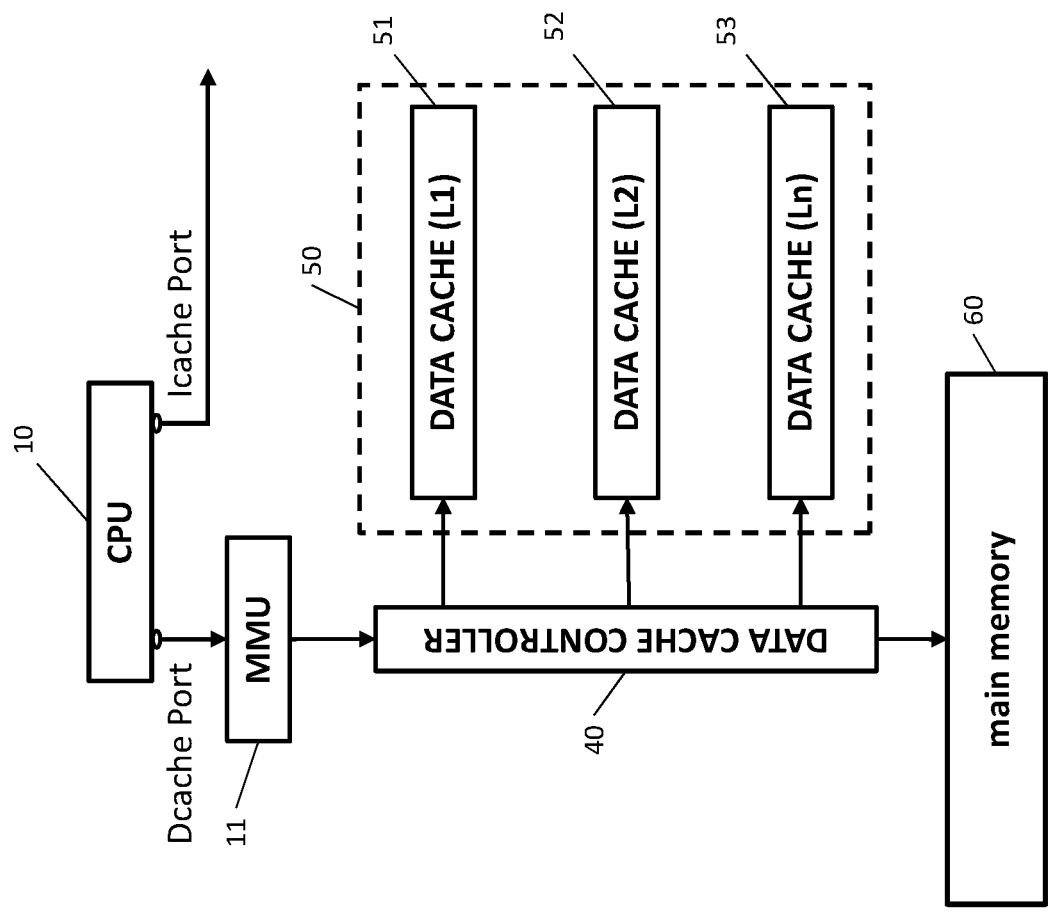
FIG. 3 illustrates a conventional data cache organization.

Before the disclosure is presented, a brief overview is first given of the typical way of data handling. Reference is thereby made to FIG. 3, which depicts the data access control only. Whenever a CPU's processor core issues a load/store operation to the system memory, a virtual address is sent from the core to the Memory Management Unit (MMU) 11 via the Dcache port. The MMU translates the virtual address in to a physical address. In order to improve the virtual address translation speed, the MMU may contain a translation lookaside buffer (TLB). The physical address is then sent to a data cache controller 40, which checks if the desired data is already in the L1 data cache 51. If the access is a hit (i.e. the data is in the cache), the selected word(s) are delivered from the L1 cache directly to the core. Otherwise (hence, in case of a cache miss) the request is forwarded to the next cache level (possibly, until the main memory 60 is reached). In a typical cache implementation, a conventional instruction cache memory (not shown in the figure) is also provided which is connected with the CPU via an Icache port.

Global data, stack data and heap data are all considered equally; every access goes through the MMU 11 and to the data cache, for example to the L1 cache 51 (except for data labelled as non-cacheable, which directly go to the main memory).

In the approach of this disclosure, a special treatment is given to certain stack accesses which are redirected to a scratchpad data memory 20 instead of the data cache 50.

More particularly, the present disclosure relates in a first aspect to a data memory hierarchy for a system in a system-in-package, which in addition to the data cache memory contains a memory structure comprising at least a level 1, L1, memory array having a plurality of clusters with one or more banks of scratchpad memory (SPM) 20. In the proposed memory hierarchy, increased energy efficiency is achieved by providing a data access controller which (i) ensures a software management of the memory banks of the clusters of scratchpad memory and (ii) allows the user or the operating system to decide what data to map in the scratchpad memory 20 and when a data transfer should take place. The interconnection overhead remains low, especially if a limited number of banks of scratchpad memory are provided.

With system-in-package (SIP) is meant a number of integrated circuits enclosed in a single module (package). At least a part of the application running on the processor comprising at least one processing core has no source code available.

Figure 4A:
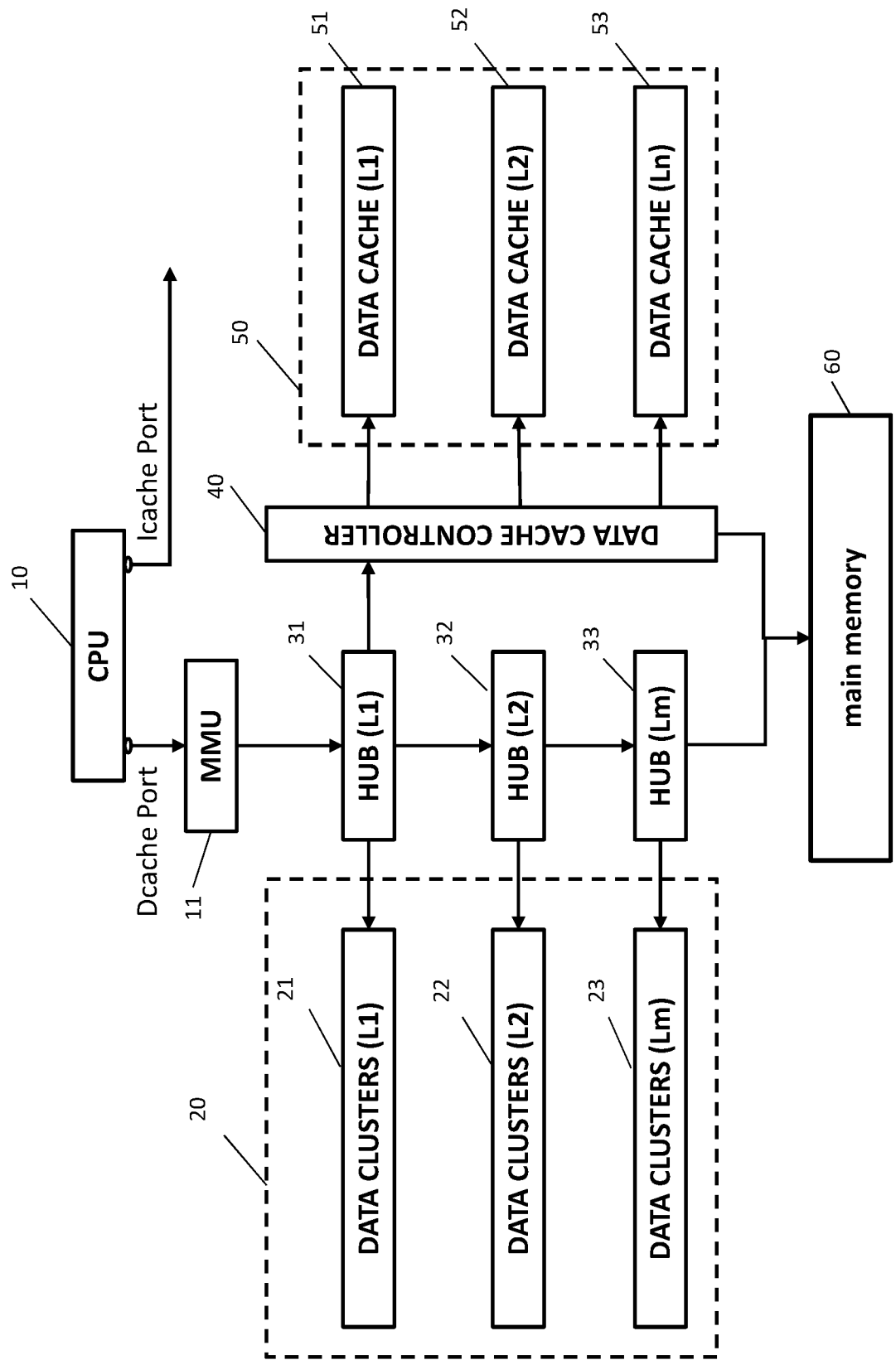
FIG. 4A illustrates an overview of a memory hierarchy according to an embodiment of the disclosure, along with a CPU, a memory management unit and a main memory, according to an example embodiment.

A block scheme of an embodiment of the clustered scratchpad memory 20 applied in the memory hierarchy according to an embodiment of this disclosure is illustrated in FIG. 4A which depicts the data access control only. A central processing unit 10 is shown which may contain one or more processing cores. Via a data transfer port (not shown in the figure), the memory hierarchy is connected bi-directionally and directly with a memory management unit 11 and so to the CPU 10. The memory hierarchy comprises a hierarchical structure and comprises a data cache 50 with at least a level 1, L1, data cache memory (DL1) 51 and a memory structure having at least a level 1, L1, clustered data scratchpad memory array 21 comprising a number of clusters 21a, . . . , 21k, each of which may have one or more banks of scratchpad memory. The interaction with at least one bank of scratchpad memory of at least one cluster 21a, . . . , 21k is steered by a data access controller 31 (also referred herein shortly as a hub). The cluster and its memory banks thereto have a bidirectional connection to this hub 31 for data transfer. In a typical implementation, there is also a conventional instruction level 1 (IL1) connection with the CPU via an Icache port.

Figure 5:
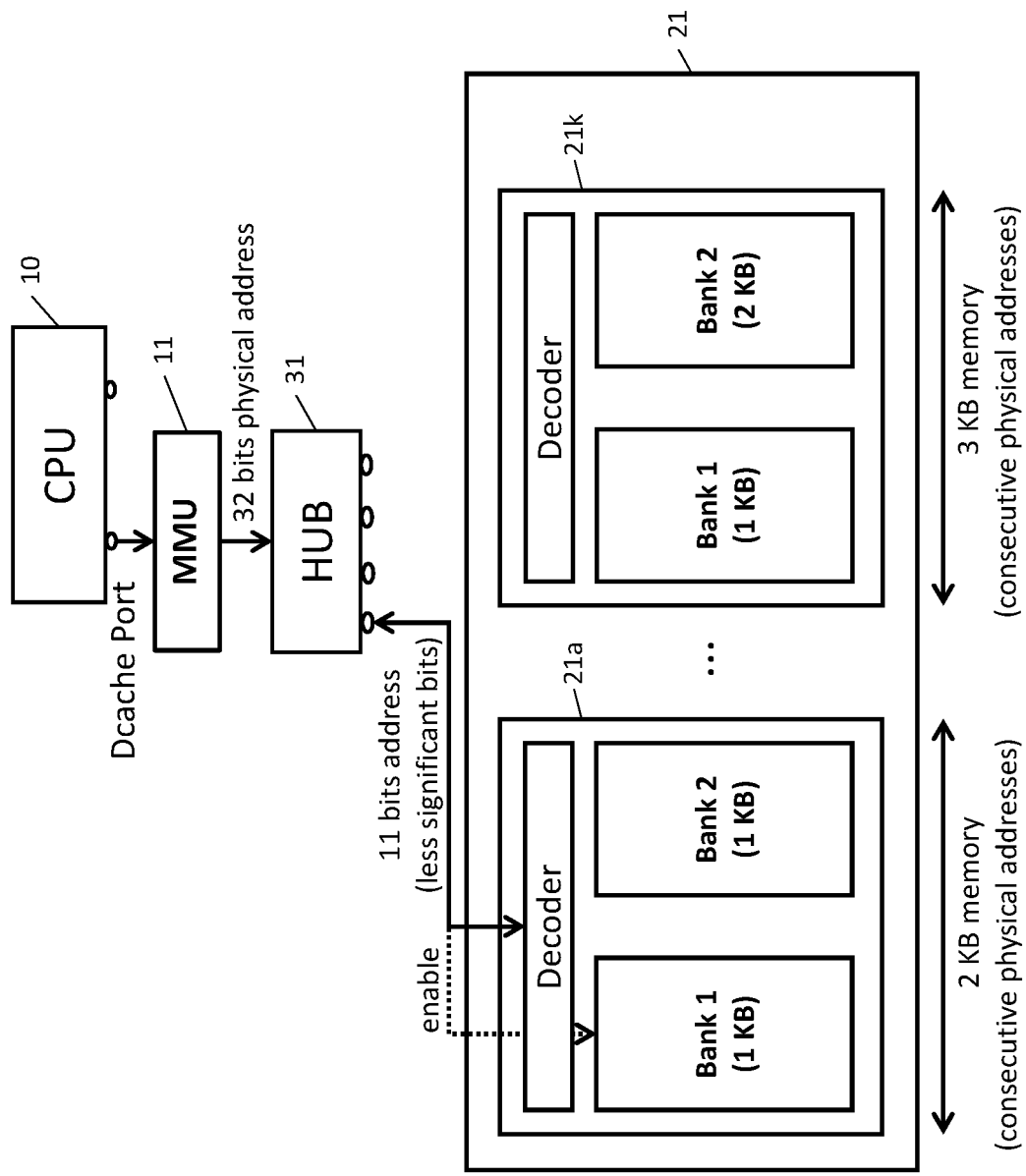
FIG. 5 illustrates the interconnection between the CPU, the memory management unit, the data access controller and the data clusters according to an example embodiment of the present disclosure.

FIG. 5 gives some more details on the data access control interconnection between the CPU 10, hub 31 and a plurality of clusters 21. This example shows the CPU 10 sending a virtual address from a CPU data port (Dcache Port) to the hub 31 via a memory management unit 11. The MMU translates the virtual address into a physical address. Each data cluster 21a, . . . , 21k contains a decoder and a plurality of memory banks. In this example, the first data cluster 21a is shown to have a 2 kB memory (having consecutive physical addresses) composed of two 1 kB memory banks. The k-th cluster 21k is shown to have a 3 kB memory (having consecutive physical address) composed of 1 kB and 2 KB memory banks. In certain embodiments, the clusters may comprise the same or different number of memory banks, wherein the memory banks may have the same or different sizes. The cluster decoder has a functionality of a conventional decoder, which is for the physical address, and comprises input/output drivers, etc. All clusters share power and clock signals. Depending on the actual physical address issued by the CPU, the hub routes the data request to the data cache 50 or to one of the memory banks of the at least one cluster 21. The address mapping is fixed for the whole CPU request's execution, so the hub implementation can be very simple. The hub merely has to examine the most significant bits (MSBs) of the incoming address in order to drive the signals to the corresponding cluster or cache. The most significant bits (MSBs) are used to enable the corresponding scratchpad bank and the least significant bits (LSBs) (in this example an 11 bit physical address of the 32 bits address) is transmitted to the decoder of the first cluster 21a via the hub. The data values coming from the processor 10 are transmitted to the corresponding cluster via the data transfer interconnect. All information is received via a data port in the data access controller 31. The hub then checks if the received address is in the address range of the scratchpad memory cluster 21. This check is typically performed using a controller, e.g. a simple combinational logic, which checks the most significant bits of the 32 bit address. If the address is indeed in the address range, the data request is forwarded to the respective bank in the cluster where the physical address is required to access the data. If the received physical address is not present in any of the banks of the cluster 21, the address is forwarded to a cache controller 40 which steers the data cache 50 which comprises at least a L1 data cache memory 51. As also state information can be present, the hub controller optionally also comprises a sequential logic controller for realizing the hub controller functionality. In case the address is not located in the scratchpad memory 20, the hub forwards the full 32 bits address to the cache controller 40. The cache controller, which operates as a conventional cache controller, checks if the data is already present in any of the data cache levels 51, 52, 53. If not the request is forwarded to the main memory 60. The cache memory, as shown in the figure, may comprise one or more hierarchical levels.

As illustrated in FIG. 4A, the data scratchpad memory 20 may further comprise a L2 level containing a number of clusters 22 having one or more banks of scratchpad memory and a second data access controller 32 with basically the same functionalities as the data access controller 31 of the L1 scratchpad memory.

FIG. 4A further illustrates that the memory hierarchy may comprise a L3 scratchpad memory containing a number of clusters 23 having one or more banks of scratchpad memory and a data access controller 33. Again the data access controller has the same functionalities as the one described with respect to level L1 and L2.

The address access control for the proposed memory hierarchy with a data scratchpad memory comprising at least two hierarchical levels can be arranged in at least two ways (or hybrids thereof) as detailed below.

Figure 6A:
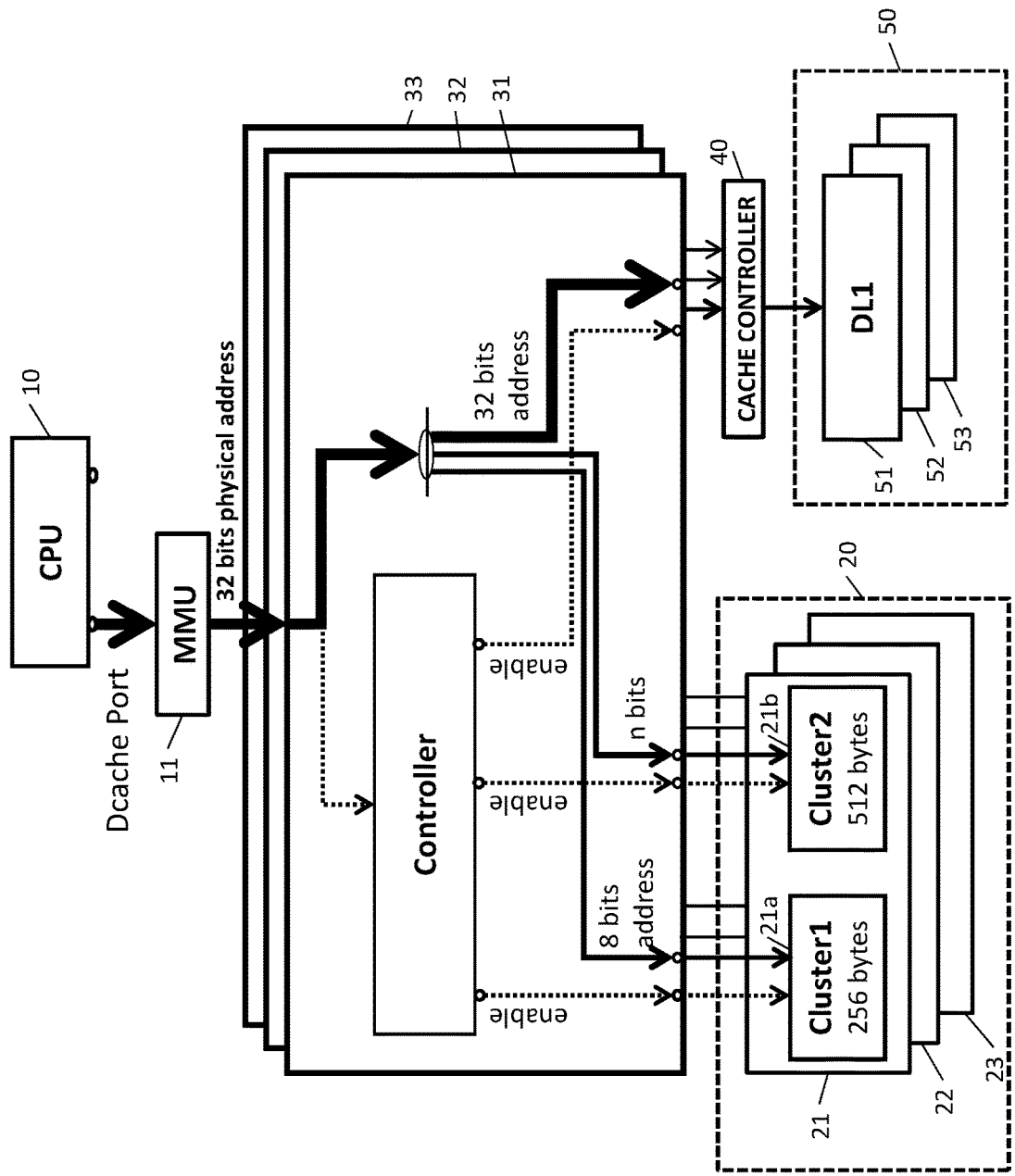
FIG. 6A illustrates the operation of the data access controller according to an example embodiment of the present disclosure.

The first approach is referred herein as a vertical approach. In this approach, as shown in FIG. 4A, each data access controller 31, 32, 33 is aware of the address ranges within all of the data clusters and can base its decision to forward the address either to its own data clusters or to the next level data access controller. In addition, the first data access controller can forward the request to the data cache controller 40. For example, as shown in FIG. 6A, if the data access controller 31 receives a physical address that is maintained in one of the clusters 21, it will forward the data request to this cluster. If this is not the case, but the physical address is contained in a higher level data clusters 22, 23, it will forward the data request to the next level data access controller 32. If this is not the case, the data access controller 31 will forward the request to the data cache controller 40, which will handle it as a traditional access to the data cache 51, . . . , 53. Finally, if the data is not in the scratchpad clusters, nor in the data cache, the request is forwarded to the main memory 60 either by the highest scratchpad memory or by the data cache controller.

FIG. 6A illustrates data access control interconnection wherein the first controller 31 receives a 32 bits physical address from the MMU 11. The most significant bits of the address are used to select the memory bank of the L1 cluster to be driven, see 'enable' signal, and the least significant bits are delivered to the corresponding memory bank to perform the access. In this figure, the first 8 LSB bits address is forwarded to the first scratchpad cluster 21a, and the remaining n LSB bits address to the second cluster 21b. If the address is not located in any of the clusters at level 1, but it is contained in a higher level data clusters, 22, 23, the data request is forwarded to the data access controller at a higher hierarchical level, i.e. 32 or 33. If the address is not located in either of the clusters 21, 22, 23 then the data request and the 32 bit address are forwarded to the data cache controller 40 and to the data cache 50 itself.

Figure 4B:
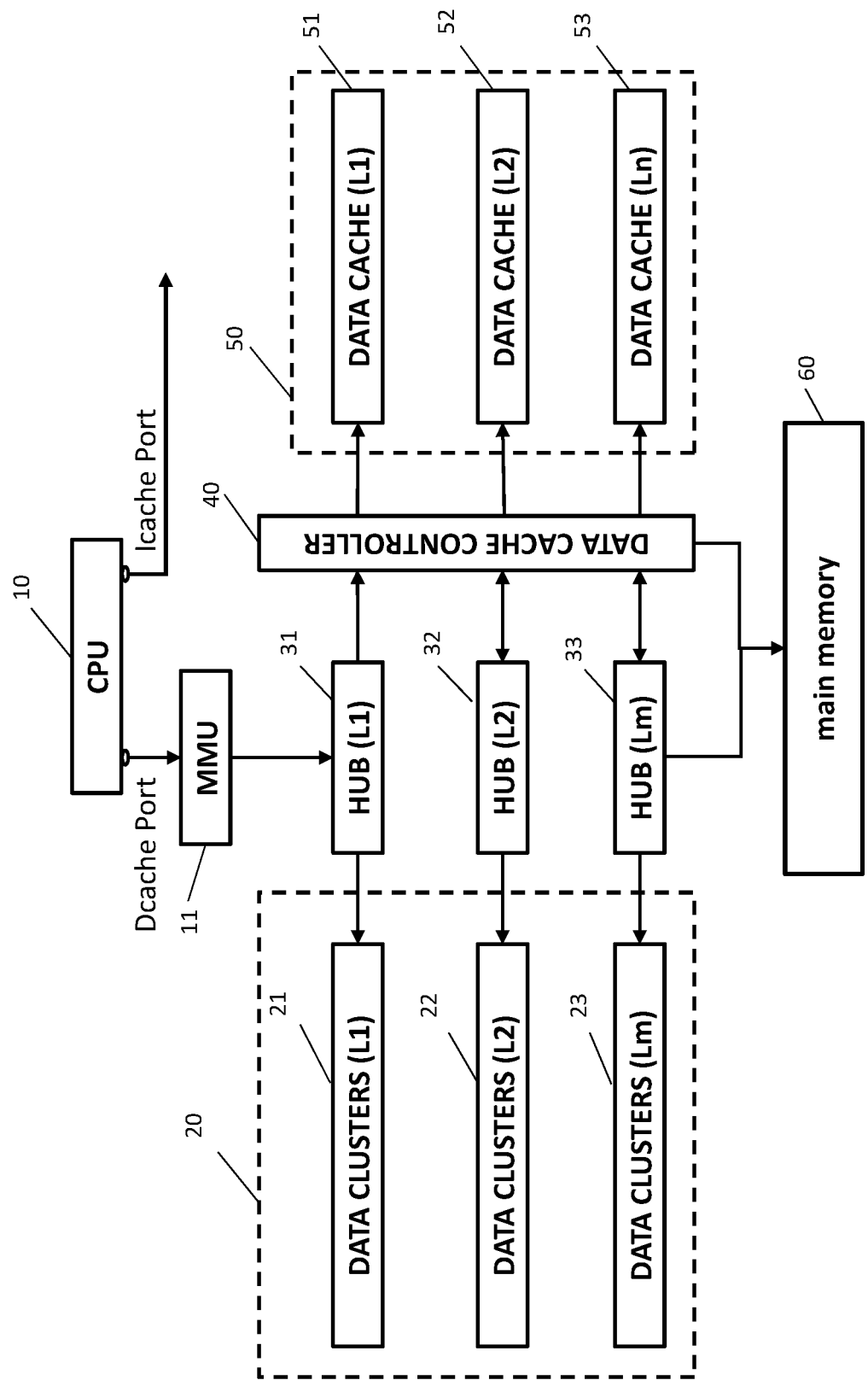
FIG. 4B illustrates an overview of a memory hierarchy according to an embodiment of the disclosure, along with a CPU, a memory management unit and a main memory, according to an example embodiment.
Figure 6B:
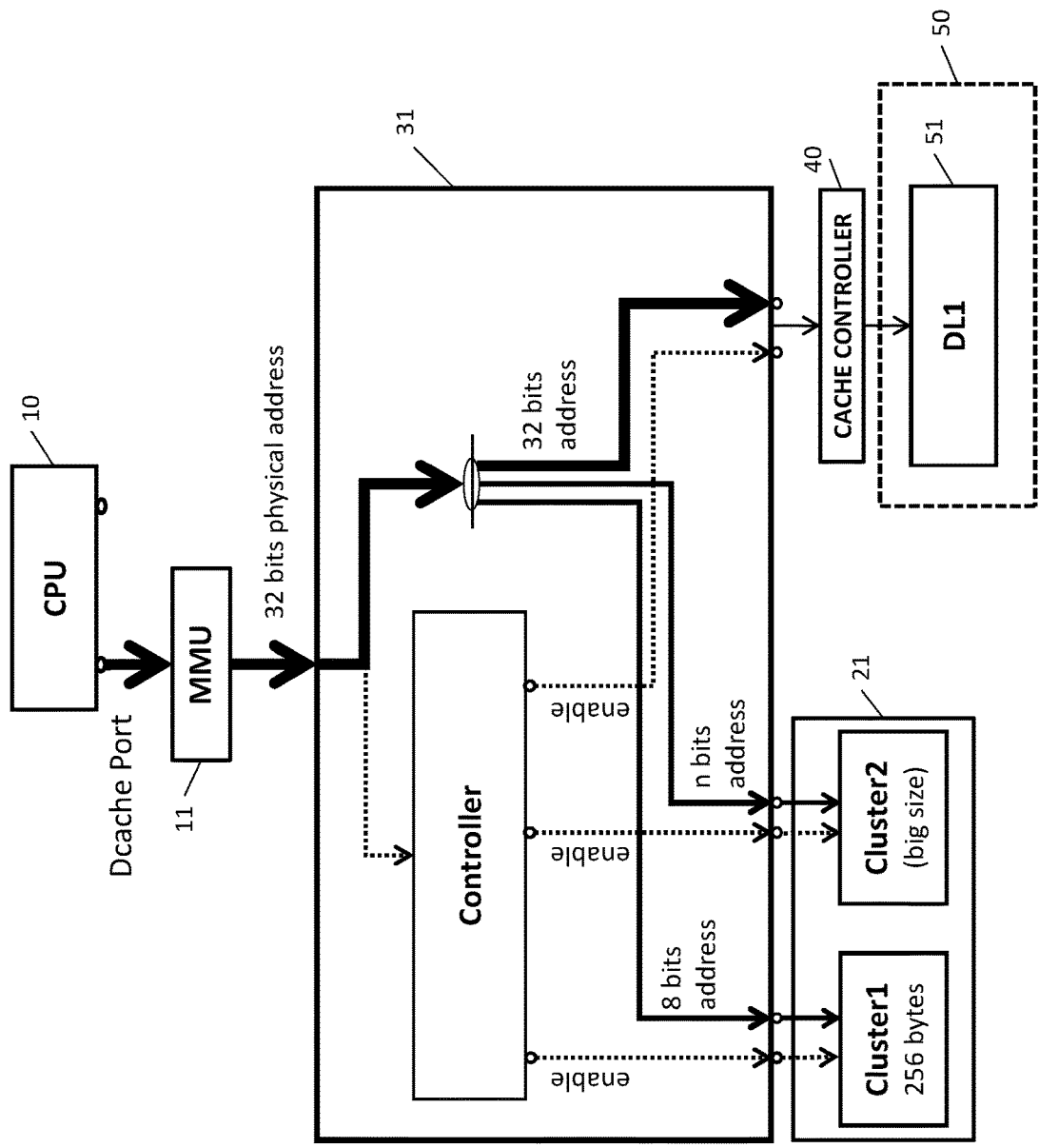
FIG. 6B illustrates the operation of the data access controller according to an example embodiment of the present disclosure.

The second approach is referred herein as a horizontal approach. In this approach, as shown in FIG. 4B and FIG. 6B, the data access controllers 31, 32, 33 do not require knowledge about the addresses maintained in data clusters of other levels. As in the previous approach, the data access controller, e.g. hub 31, first checks if the address is available in one of its data clusters 21, and forwards the request to that data cluster if the address is found. In case of a miss, the data request is forwarded to the data cache controller 40, which checks if the data is available in the same level data cache (e.g. data cache 51). In this case, the data request gets forwarded to this data cache. Only in case of a miss at the data cache controller 40, the data request is forwarded to the next level data access controller, e.g. hub 32. Finally, if the data is not present in the scratchpad memory 20 or in the data cache memory 50, the data request is forwarded to the main memory 60 from the highest level data access controller, i.e. hub 33, or from the cache controller 40.

In more detail, the data controller 31 receives the data request and a 32-bit address from the MMU 11. The most significant bits of the address are used to select the memory bank of the L1 cluster to be driven, see 'enable' signal, and the least significant bits are delivered to the corresponding memory bank to perform the access. In this figure, the first 8 LSB bits address is forwarded to the first scratchpad cluster 21a, and the remaining n LSB bits address to the second cluster 21b. If the address is not found in any of the clusters 21, the controller 31 forwards the data request and the 32-bit address to the cache controller 40 which checks whether this address is located in the L1 data cache 51. Only, if there is a miss at the cache controller the request is forwarded by the latter to the next level data access controller, e.g. controller 32, and possibly until the main memory 60 is reached.

Figure 4C:
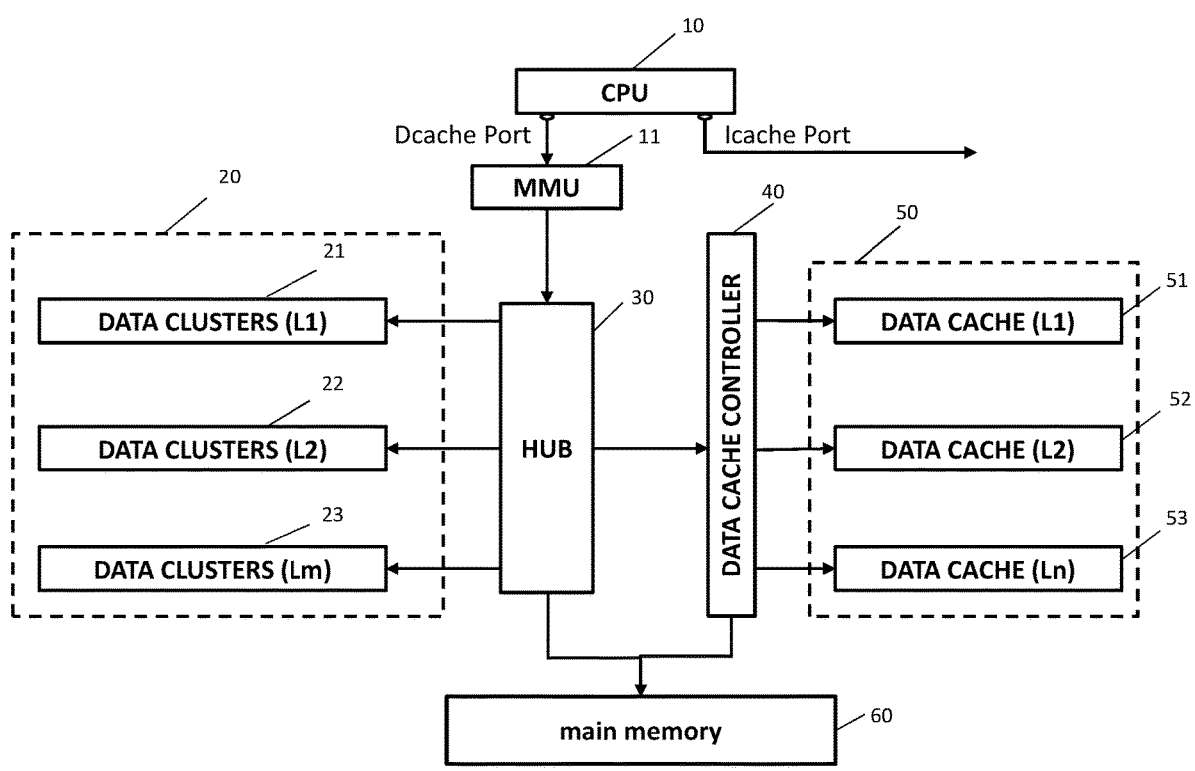
FIG. 4C illustrates an overview of an example implementation of a memory hierarchy according to an embodiment of the disclosure, along with a CPU, a memory management unit and a main memory, according to an example embodiment.

In certain embodiments the data access controllers at each hierarchical level 31, 32, 33 may be integrated into a single data access controller 30 as shown in FIG. 4C. Again the data access controller 30 has the same functionalities as described above and can operate according to the vertical or the horizontal approach or a hybrid form thereof. In an example, the hub 30 operates in a vertical approach. In this case, the hub 30 is aware of the address ranges within the data clusters 21, . . . , 23 and can base its decision whether to forward the address either to the corresponding data cluster (e.g. data cluster 23) or to the data cache controller 40 or main memory 60.

In certain embodiments the scratchpad memory at L1 and L2 levels are integrated into a single memory array. In other embodiments the L1, L2 and L3 scratchpad memory are integrated into a single memory array. In these embodiments, each memory array may have a dedicated or a common data access controller which has a functionality as set out above and operates either in vertical or horizontal approach.

Stack Management—Page Allocation

The proposed memory hierarchy allows for a mapping of the page granularity. The translation of a virtual address into a physical address in the memory management unit (MMU) 11 is performed at a certain page granularity. The address space is split into equally sized blocks (called pages). The most typical page size is 4 kB, although most modern architectures also support larger page sizes. To perform the translation, the most significant bits (MSB) of the address (e.g. the 20 MSB bits in a 32 bits architectures with a 4 kB pages), are checked against all entries of the translation lookaside buffer (TLB), which is an associative table with the latest translations. If there is a match, the TLB contains the corresponding physical bits. The physical address is obtained by concatenating the physical bits with the original 12 least significant bits.

Mapping certain stack pages onto the SPM using that typical page size of 4 kB, however, imposes a granularity for the allocation decisions which is too broad. Therefore herein, it is proposed to modify or extend the TLB to allow for differently sized pages. In an example embodiment two different page sizes are enabled. For example, the conventional 4 kB and a smaller size, e.g. 2 kB, 1 kB, may be employed. Using smaller pages (e.g. smaller than 1 kB pages size) would significantly increase the number of pages for a process, and thus, the number of TLB misses and fault exceptions, thereby severely degrading both performance and energy consumption. Another example of a page allocation is 4×1 kB pages, 2×2 kB pages and 1×4 kB pages. The size of the pages depends on the specific application requirements.

In an example, the modifications to TLB to allow dual sized pages are minimal. It suffices to add an extra bit to indicate if it is a big page or a small page is enough. For pages smaller than 4 kB, the TLB entries become large enough to hold the two bits extra for the physical address to unambiguously translate small pages. The decision to which page size the data request is to be allocated is done by the data access controller and is based on the profiling of the object code.

In one embodiment, to ease the address translation, a restriction can be imposed on the page alignment. For this purpose, during the organization of the pages in the physical address space of the memory, it is imposed that all finer grain pages (e.g. the 1 kB pages in our example) are put consecutively in that physical address space up to the largest grain page size (e.g. 4 kB in our example). It is still allowed to leave gaps in the physical address space but only in between the larger blocks, i.e. forming a 4 KB page. An example of a valid address space organization with pages sizes of 1, 2 and 4 kB would be: 0, 1, 2, 3, gap of e.g. 4, 8, 9, 10, 11, gap of 12, 24, 25, 26, 27, . . . kB. In this way, the TLB translation from virtual to physical addresses is simplified also for the larger grain pages. In the above example the 4 kB pages would then namely be starting at 0, 8 and 24 and all of the bytes are arranged consecutively, e.g. from 0 to (4 kB−1). Without this restriction, the 1 kB pages could be dispersed across the entire physical address space with gaps everywhere. An example could be 0, 3, 4, 7, 8, 10, 14, 17, 21, 23, 26, 27 . . . kB. Then the TLB has to store more information and invest more cycles for the virtual to physical translation of the 4 kB pages. This requires the page table organization to be adapted accordingly.

Stack Management—Access Control Management

In order to avoid that all stack frames be allocated on the scratchpad memory (SPM) 20, it is useful to carry out a profiling to detect which stack frames take most benefit from SPM allocation. To do so, this may involve analyzing the number of accesses to a stack frame per function invocation, the frame size (whereby especially the ratio of access count to frame size is relevant) and performing a reuse analysis to get an idea of the 'time' between consecutive function calls.

One approach to follow could be to select which stack frames to map to the SPM while all other stack frames are kept in main memory. For such approach, it may not be required to perform any recompilation of the source code, and hence the source code may not be required. Decision on which stack frames to be mapped to the SPM can be taken for example based on the following:

Instrument the application using e.g. a dynamic binary instrumentation framework such as the Intel's PIN tool or a similar tool to monitor every function call, the size of each stack frame and the number of accesses to each stack frame (by tracking load/store instructions relative to scratch pad memory);

Run the application with several inputs;

Build a function call tree from traces and annotate it with size, number of invocations and number of accesses information;

Select the subtrees which maximize the total number of accesses while meeting space requirements. Note that stack frames of different branches are never simultaneously active.

In order to enforce the mapping decisions, a code may need to be injected into the binary code, which is achievable with any binary rewriting tool like the Intel PIN tool. At the selected subtree entry point, a code which adds padding to current stack frame is injected to make the new stack frame page aligned. On the next page fault in the stack region, the page will be placed in the SPM.

Heap Management

In an example, the proposed memory hierarchy can be used for stack management as well as for heap management. This is achieved by enabling transparent and runtime customization of the dynamic memory management (DMM) system services for applications of which the high level source code description is not available, as is normally the case for commercial applications and legacy code. The heap management approach set out below targets a system-in-package architecture with a processor with at least one processing core and a memory hierarchy as described above.

The customization of DMM service is independent of the application source code being available. Given only the object code of an application, i) the heap memory behavior is profiled, as detailed below, and ii) application-specific optimization is performed on the dynamically allocated data structures and their dynamic memory managers, i.e. dynamic memory allocation policies and data dynamic placement. Techniques such as in "*Custom Multi-Threaded Dynamic Memory Management for Multiprocessor System-on-Chip Platforms*" (S. Xydis et al., ICSAMOS'2010, pp. 102-109, 2010) and "*Systematic dynamic memory management design methodology for reduced memory footprint*" (D. Atienza et al., ACM Trans. Des. Autom. Electron. Syst. 11, 2 (April 2006), pp. 465-489) can be utilized to perform step ii). The proposed profiling approach as described above in "Stack management—Access control management" is utilized herein as well. It further allows specifying either a cooperative design- and run-time heap management (shown in FIG. 7A) or a completely run-time heap management and customization approach (shown in FIG. 7B). Taking into consideration the heterogeneous memory hierarchy, it dynamically modifies the dynamic memory manager (DMM) utilizing the addressing features of the hub 30, 31, 32, 33 to reallocate the most accessed data to scratchpad memory 20, so that the performance is increased and the energy reduced.

Figure 7A:
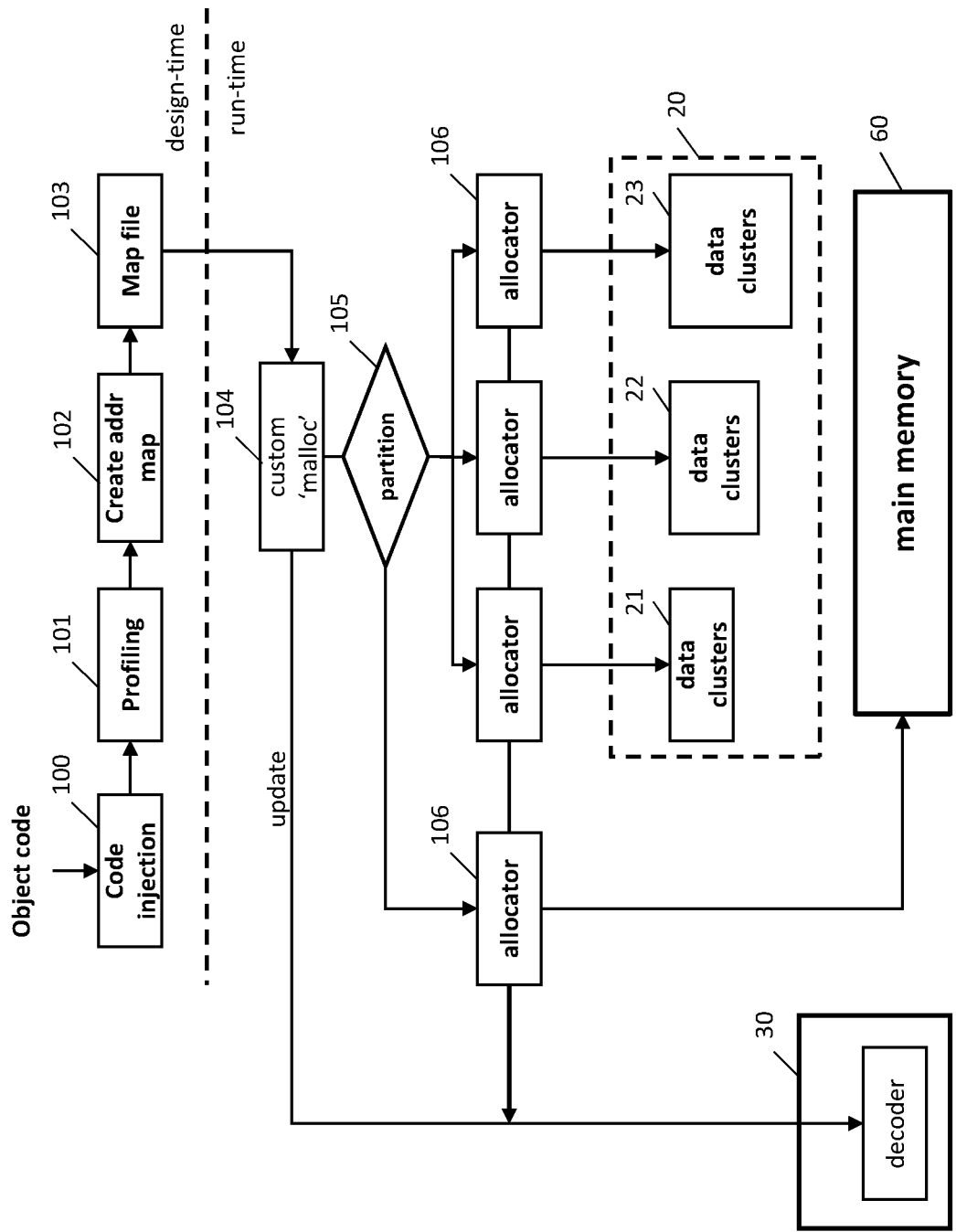
FIG. 7A illustrates a schematic view of the heap data analysis according to an example embodiment of the present disclosure.

The cooperative design- and run-time approach is shown in FIG. 7A. At design time the following main steps are performed. Given only the object code of the application, a heap profiling is performed considering specific heap metrics, e.g. the number of accesses, for the heap data structures and/or other important information such as allocated sizes, pointer addresses, heap's memory footprint and heap's fragmentation etc. For the purpose of profiling application specific code is injected into the application's object code in order to be able to log the desired information (see "Code injection" block 100). The output of the profiling 101 is a log file, which is next processed by a secondary program/executable to mine the profiled information and arrive at crucial allocation and placement decisions e.g. which addresses should be placed in the scratchpad memory (see "Create addr map" block 102). In an example embodiment the most accessed addresses are placed in a fast and energy efficient scratchpad memory. Thus, a mapping is created to connect each address to a specific memory (see block "map file" 103). Then the function/system call for memory allocation (e.g. 'malloc') in the original object code is overwritten by an application specific allocator (in "Custom 'malloc'" block 104). Each application specific allocator (i.e. the allocator blocks 106) then reads the address from memory module mapping and decides at run time where to allocate each structure and/or updates the hub's decoder 30, 31, 32, 33 used during the runtime of the application to decide whether this element should be accessed from the scratchpad memory 20 or the main memory 60.

As detailed above, the heap profiling is performed without having the application source code at design time. An application specific malloc function, which is a standard 'malloc' function modified with information derived from the profiling of the application, is injected at the object code level (performed by block 111 in FIG. 9) to keep logging information each time a data structure is allocated (performed by block 112 in FIG. 9). Such application specific logging information includes (but not limited to):
 the returned pointer;
 the allocation size;
 a unique ID for that data structure (required in order to know where each address belongs);
 a timestamp of the allocation.

Similarly, when deallocating a structure, it may be needed to log the pointer marking the deallocated memory region and the timestamp of the deallocation. Timestamping of allocation and deallocation operations is used to enable the calculation of allocated data lifetime, distinguishing the data structures in the application data that "owns" each memory access. It is possible that, during the execution of the program, the same memory address is given to a data structure and then, when it is deallocated, it is reused by another data structure.

Figure 9:
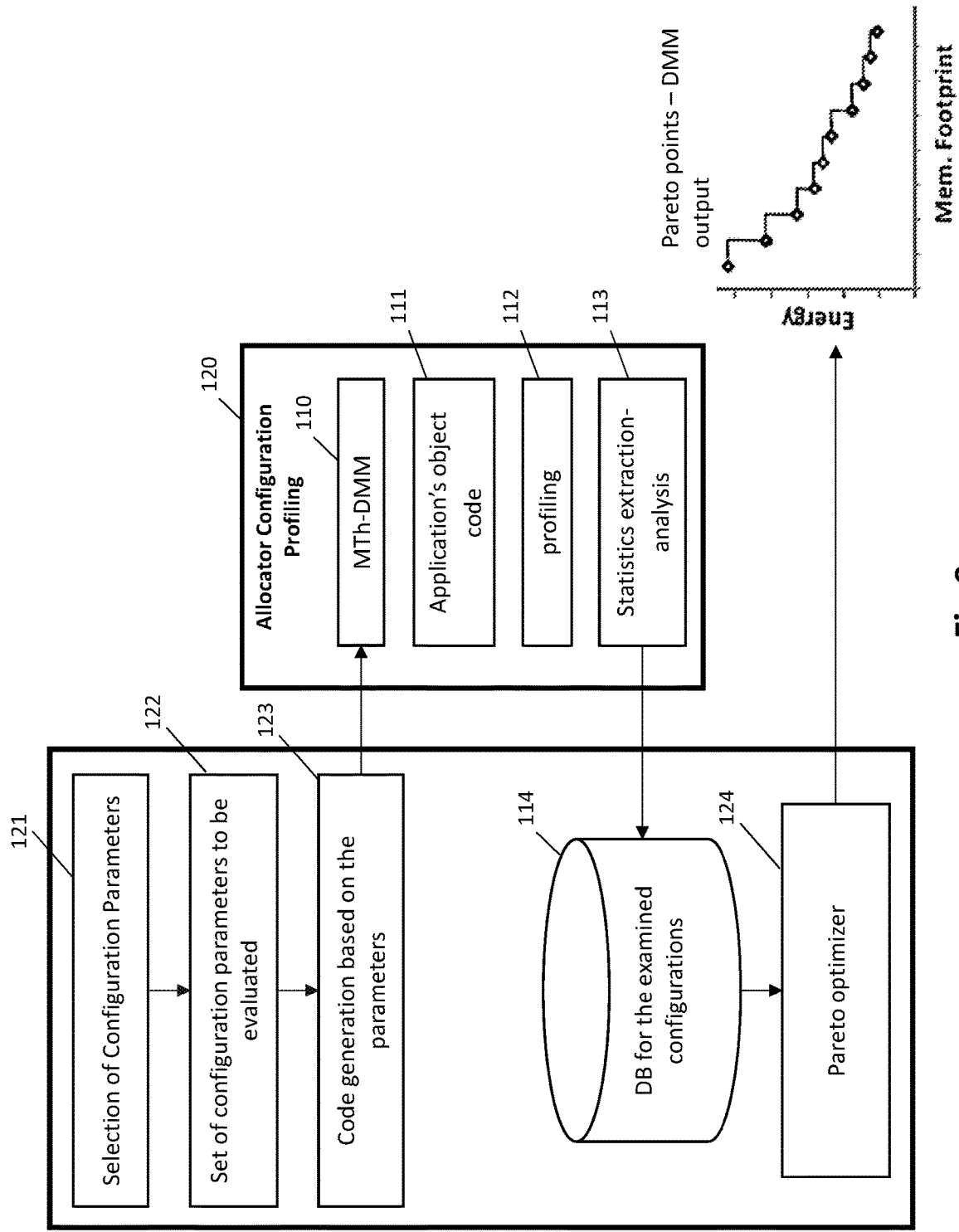
FIG. 9 illustrates a DMM customization technique for multi-threaded applications targeting to multi-core architectures, according to an example embodiment.

Injecting an application specific version of a function (such as 'malloc' to allocate memory or 'free' to deallocate memory) is performed at the object code level (performed by block 111 in FIG. 9). An application specific version (also referred herein as a custom version) of the function is created to which the code providing the application specific profiling functionality (performed by block 112 in FIG. 9) is added to log the given pointer, timestamp, allocation size, ID, etc. During the execution, the application uses the custom version for the given function, so that the required information can be logged and stored (performed by block 114 in FIG. 9). The sample information for a malloc function is:
 address of the allocated memory—this is the returned pointer
 size of the allocated memory—this is passed as a parameter in the malloc function call. This information allows associating a memory address with a data structure.
 ID for the data structure, which allows distinguishing among different data structures. The ID can be calculated as the instruction invoking the malloc (assuming that different data structures are allocated in different regions of the program). The offset can be used therefor (instruction pointer where malloc returns after it has finished—instruction pointer of first instruction).
 Timestamp can be taken with a time function.

For the free function only the pointer and the time may be logged, so the information is a subset of the information collected through the custom malloc function and can thus easily be implemented once a valid implementation of malloc logging is available.

During profiling, the memory accesses (i.e. memory traces) may be logged in the database (performed by block 114, see FIG. 9). Such memory traces can be produced using e.g. Intel's PIN tool or similar. The way the information is utilized, remains unchanged. Also a timestamp can easily be added.

This may be done, for example, by comparing the address and the timestamp with the information collected for each allocation (performed by block 113), each data access is associated with a dynamic data type (DDT). Note, however, that not every allocated block recognized by the custom malloc function corresponds to an actual data type. For example, a dynamic tree allocates every node separately by invoking the malloc function, probably even at the same line of the code (through a loop or a function call). Each time malloc is called, each node is considered a distinct data structure and the ID can be the same (so the combination of ID+timestamp can be used to get a unique identification). However, that does not pose a limitation for the procedure described below.

Once the memory trace is available, the addresses can be found and matched with a data type based on the address and the timestamp of the access, which is stored in the database 114. Non-heap addresses fail to match and are therefore filtered out in this stage (performed by block 113). Then the addresses are grouped based on the size of the allocated region containing them and sorted based on the allocation time.

From the memory access trace (e.g. from the Intel's PIN tool) the number of accesses of the heap addresses is extracted. Assume that only the addresses 0x00000001, 0x00000002 and 0x000000ff are heavily accessed, e.g. they exceed a user defined threshold. Based on the statistical analysis for multiple runs of the program with representative input datasets performed by block 113, it is possibly found that only the nth allocated element of a given size is of interest. A configurable range is possible (e.g. the 3rd through the 4th allocated element of size 5) based on the profiling information for a given execution of the program.

Although the heap management described above considers the analysis for only one data set (performed by block 113), it is not at all limited thereto. The dataset can also be a concatenation of a plurality of datasets. In case several input datasets are available, the results may vary when running the application for different inputs, due to dynamicity of data and the application data-driven control-flow. The proposed technique may be applied also on scenarios with multiple available datasets, by extending the data mining (block 113) of the available profiling information. In this case, for a single application several profiling and memory addresses traces are available. The goal remains the same, i.e. to extract the most accessed heap data addresses in order to be reallocated in a different memory module (e.g. allocating the most accessed heap data addresses in the scratchpad memory 20 and the least accessed heap data addresses in the main memory 60). Several techniques of scaled complexity and sophistication can be used. A straightforward approach is to relocate to the most efficient scratchpad memory cluster all the most accessed data addresses among all the profiled data sets. A more statistically robust approach may be employed based on clustering data accesses among the differing datasets, e.g. to consider the averages and standard deviations on the heap data accesses. For example, the 3rd allocated element of size 5 across all executions appears to be statistically the most frequently used. More sophisticated prediction and machine learning techniques can also be enabled, i.e. predicting during runtime the most frequently used or accessed elements with predictive models, trained at design-time. At design-time, the model is trained based on the heap history, i.e. the heap status as reported previously and recorded during design-time profiling. This training generates an analytical description of the classification or regression that predicts the memory access for each allocated live object. The predictive model is then used during runtime to trigger reallocation of heap data elements in case memory access prediction crosses the user defined threshold. The heap management is independent of the prediction model used, thus several predictive models and machine learning techniques can be explored to enhance specificity.

During the actual program execution (at run-time), this information can be used to write and embed at the object code level a custom allocation function (utilizing the same techniques described above). Each time a size is requested to be allocated, the custom malloc function decides whether to allocate some of its elements in the SPM 20 or in the main memory 60 based on the decisions rules extracted by the profiling data, e.g. how many similar requests are invoked. As the addresses relate to an offset in the allocated memory, their computation is performed once the pointer of each malloc request has been reached at runtime.

The heap management analysis is done at design time (performed by block 113) the results of which are then used during runtime. The heap management analysis is statistical, which is unavoidable given the dynamic nature of the application and the way it allocates or frees memory.

Figure 7B:
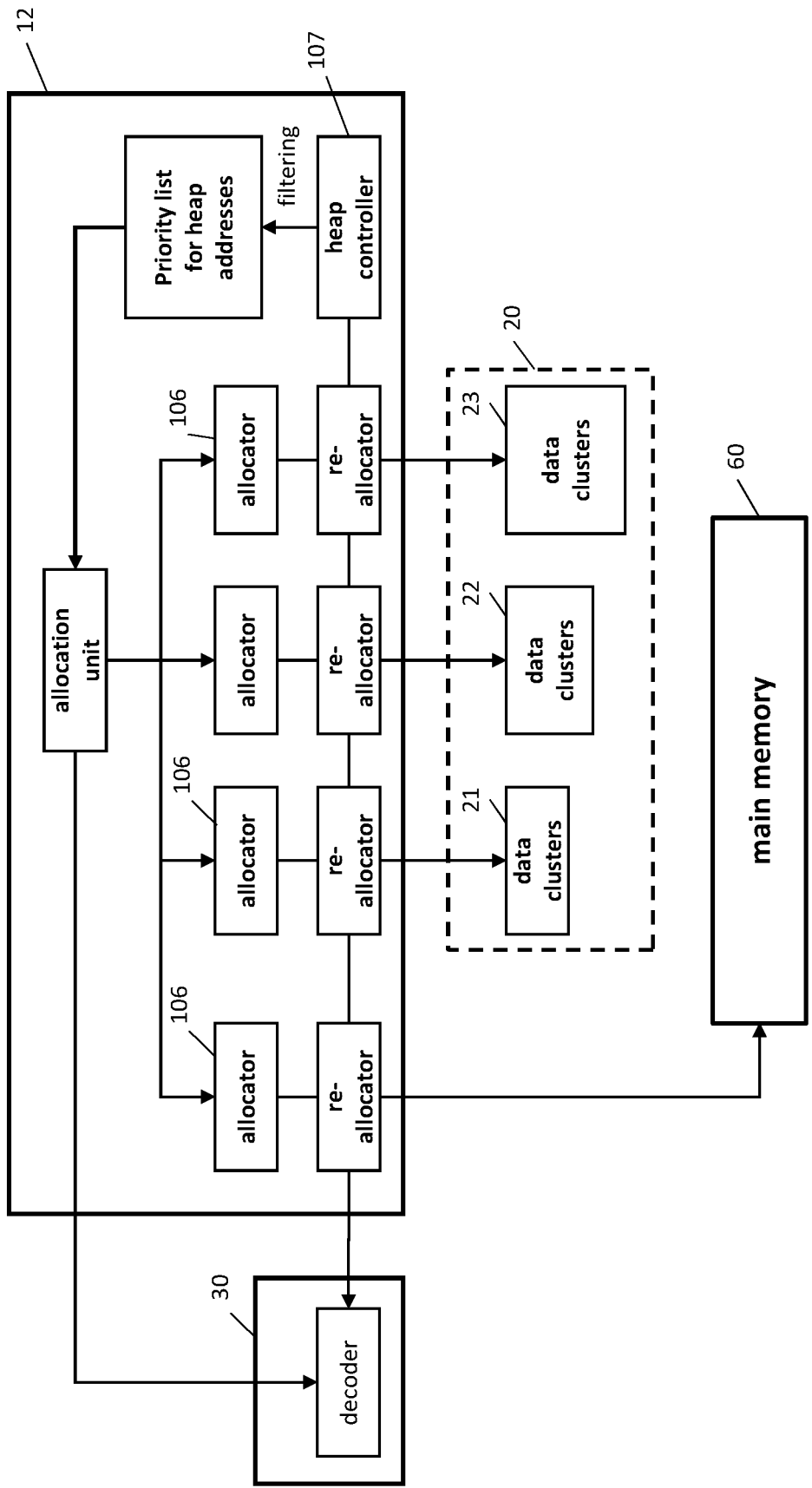
FIG. 7B illustrates a schematic view of the heap data analysis according to an example embodiment of the present disclosure.

Alternatively, the heap management analysis, instead of at design time, can be performed purely at runtime, as shown in FIG. 7B, which is different from the options for the stack management. An allocation unit has been provisioned which performs the allocation decisions according to the run-time profiling information. According to this profiling information, the allocation unit selects the memory module (i.e. scratchpad data cluster, data cache or main memory) and its corresponding allocator to serve the allocation/deallocation request. For a pure runtime approach, a specific hardware unit (referred to as heap data controller 107) may be required for handling the profiling in a runtime execution. The heap data controller (HDC) 107 is arranged to monitor and count the address/memory traces and identifies which heap addresses are the most accessed ones. It requests from the hub 30, 31, 32, 33 to reallocate from the main memory 60 to the SPM 20 the most accessed heap addresses. The functionality of the HDC 107 will be described below with reference to FIG. 7B. The HDC may be located in between the MMU 11 and the HUB, or, alternatively may be part of the central hub 30 in FIG. 4C, hubs 31, 32, 33 in FIG. 4A or part of the hub 31 in FIG. 4B.

As the application executes, the accessed addresses are also visible to the heap data controller 107. The heap data controller has a priority list that can store a given number of addresses with their corresponding number of accesses. When an address is accessed, the heap data controller updates the number of accesses for this address if it is already stored in the priority list, otherwise it replaces the less frequently accessed address with the current one. As a result, the heap data controller stores N addresses sorted by the number of accesses. The most frequently used addresses (located at the top of the sorted list) are put in the smallest SPM cluster (or at the first-level, L1, SPM cluster 21) as it has the fastest access time and therefore the maximum possible gain. The next set of addresses is put in the second-level, L2, SPM cluster 22 (which is bigger than L1 SPM cluster 21) and so on. The number of heap elements allocated in a SPM cluster is limited by the size of the cluster (also, some of its capacity may be used by stack data). At specific intervals of the program execution, the heap data controller reallocates these addresses from the main memory 60 to the SPM 20, flushing the heap data controller's stack. The reallocation is done based on the number of memory accesses profiled for each data object/structure or some other energy related metric e.g. the number of cache misses. The decoder of the HUB 30, 31, 32, 33 is also updated in order to be informed that the aforementioned addresses are now to be found in the SPM 20. The size of the priority list is of course an important decision and should be evaluated.

Figure 8:
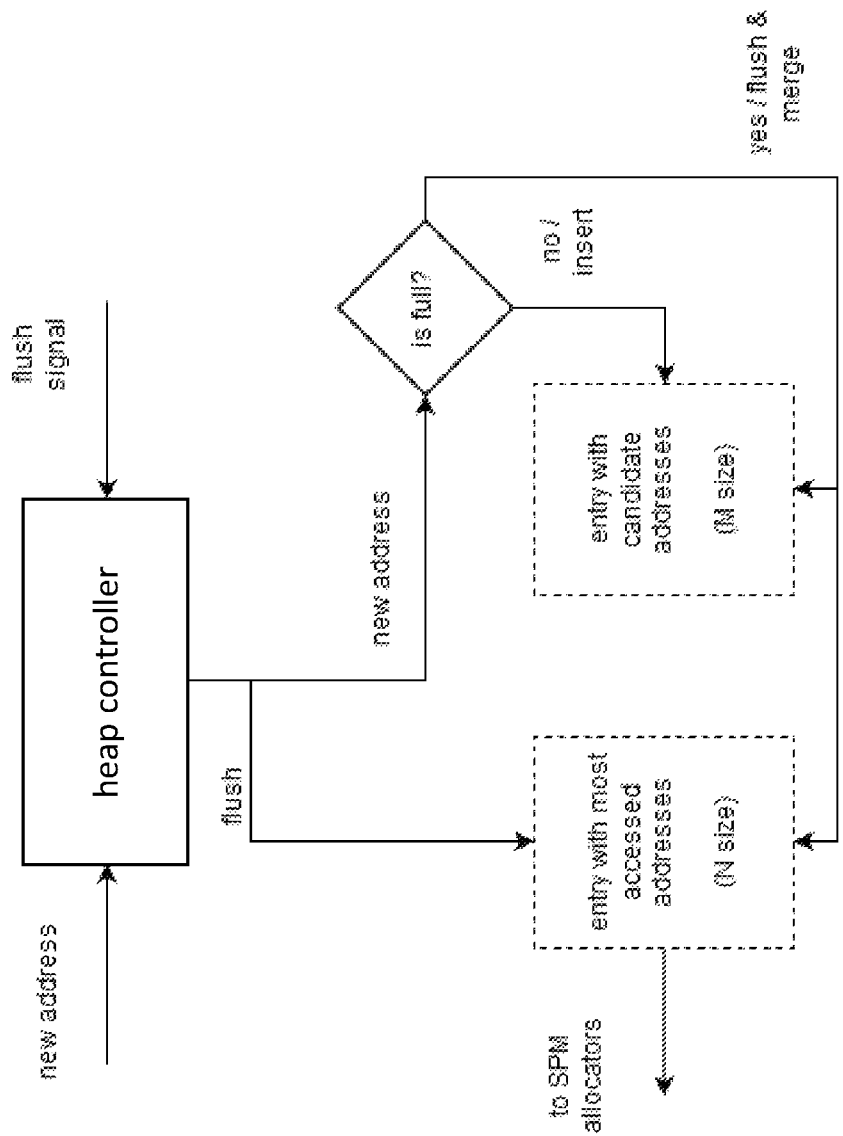
FIG. 8 illustrates a schematic view of the functionality of the heap data controller according to an example embodiment of the present disclosure.

In another embodiment, the heap data controller can use a more sophisticated technique by utilizing two arrays instead of single one to hold the priority list with heap addresses, as shown in FIG. 8. The first array, for example, of size N is arranged to store the N most used addresses. The second array, for example, of size M is arranged to be filled as new addresses are accessed. When the M array is filled, the most accessed addresses take the place of the less accessed in the N array and then the M array is flushed. At specific intervals of the program execution, the heap data controller reallocates the addresses in the N array from the main memory 60 to the scratchpad memory 20 and flushes the N array.

The step of the DMM customization is described in more detail for multi-threaded applications targeting multi-core architectures with a conventional data cache organization in "*Custom Multi-Threaded Dynamic Memory Management for Multiprocessor System-on-Chip Platforms*" (Xydis et al, Proc. IEEE Embedded Computer Systems: Architectures, Modelling and Simulation (ICSAMOS'2010), Samos, pp. 102-109, 2010) with reference to FIG. 9. The technique described in this paper is based on profiling of the source code. However, the DMM mechanisms are platform independent so they can be reused here. The technique defines the DMM parameter and policy space as intra-heap and inter-heap decisions, block 121 in FIG. 9. For example, the intra-heap design includes the selection of the allocation search order (FIFO, LIFO, size and so on), the fit algorithms (First Fit, Best Fit . . . ), the pool structure (linked lists, dynamic arrays) and many other parameters (for more information refer to the relative paper). The inter-heap decisions deal with the heap architecture (single heaps, private heaps, multiple heaps), the synchronization policy and the way that threads are mapped to the heap, but are not constrained thereto.

The implementation for each different decision is modular, i.e. different DMM allocators can be defined and implemented by combining differing DMM decisions. Automatic DMM source code generation is enabled due to this modularity (block 123 in FIG. 9). Thus, several DMM configurations can be generated automatically, compiled to a library and injected to the application as previously described. Automated design space exploration based on iterative optimization tool (block 124 in FIG. 9) is then applied to extract the optimized or Pareto-optimized points in order to select the DMM solution according to the designer's priorities.

The design space, i.e. parameters and policy space, for multi-threaded DMM is explored as follows. First, the existing tool automatically generates the source code for different combinations of decisions regarding the memory allocator, referred as block 121 in FIG. 9. Then the source code of each solution is compiled and linked to the dynamic application's code, without any need for its source code and possibly evaluated by running the application and analyzing the statistics block 113. For this part, the object code should be instrumented. The same instrumentation methodology (block 112) described above should be used, possibly extended with other optimization goals, i.e. memory footprint, heap fragmentation etc. In this case the function associated with the malloc, free, new, delete functions need to be replaced, so that an evaluation can be performed for every solution. Afterwards, a secondary program/executable processes the results and presents the Pareto points to the programmer. Once a decision is made, the source code realizing this decision is automatically generated and then it is compiled as a library and linked to the application's object code.

As shown in FIG. 9, only the block "Allocator configuration profiling" 120 needs the original application to run. The other blocks relate either to the preparation (automated code generation for use by the application) or the processing of the results (analysis) and are done outside the runtime of the application. The proposed heap management analysis described above is to replace the functionality of this block. To conclude, the DMM methodology is easily applicable in the aforementioned context without significant changes. The changes are aimed at getting the profiling information from the object code instead of the source code in order to apply this methodology.

On top of the DMM refinement stage described above, more optimization can be applied on the dynamic data types (DDTs) present in the application execution. The goal of a Dynamic Data Type Refinement (DDTR) stage is to replace the data structures of the application in order to achieve improved metrics (in terms of energy or number of accesses or performance). In a nutshell, the main steps include the recognition of the dynamic data types (DDTs) followed by their substitution with other DDTs in order to perform an exploration. Based on the results, some Pareto points are presented to the designer who selects the DDT combination that yields the desired behavior. However, the conventional techniques cannot be directly applied in the specific context due to the fact that they operate at source code level in which they directly identify and associate information with a specific data type. In the present disclosure, it is proposed to perform the manipulation of the DDTs at the object code level which involves identifying the DDTs from the object code instead.

The main challenges in this context relate to the detection of the DDTs in the first place. In its initial implementation (described in "*Optimization methodology of dynamic data structures based on genetic algorithms for multimedia embedded systems*" (C. Baloukas, Journal of Systems and Software 82(4), pp. 590-602, 2009)) the DDTs are spotted in the source code because an accepted interface is followed by the program (like STL) or some annotations are added. However, in the object code it is not possible to distinguish the data structure. One can only see calls to the system's malloc to request memory. There is no information whether this memory corresponds to a node of a linked list or to a tree node. Therefore, it is proposed to devise a way to identify/distinguish data types for the object code and, secondly, to modify the identified DDT with the aforementioned method.

Once these two tasks can be performed (as detailed below), the overall methodology of Baloukas is relatively straightforward to reuse and to accomplish. It mainly suffices to run the modified application with each combination of DDTs and to profile it. At the end the tool (external program) presents the results, the DDT combination is selected and finally inserted in the application as described above.

The DDTs are data allocated by the dynamic memory manager at the application's heap space. In the general case, at the object code level, there cannot be any observability regarding the DDT node insertion, deletion etc. due to the fact that the DDT is user defined, usually using functions with custom naming that cannot be efficiently captured/mined from the symbol table. In the special case that the programmer has used standard DDT libraries, e.g. STL etc., a methodology similar to the one described for the DMM can be reused, given that the function interface for the DDT management is a priori known. For the more general case that the programmer uses its own naming conventions for the DDT management, then the identification of the DDT can be performed probabilistically through the mining of the data objects allocated to the heap (block 113 in FIG. 9). Under the assumption of a single DDT containing data elements or nodes of the same size, all data elements of the same size found in the heap are considered elements of a single DDT. In order to infer the DDT implementation of these data elements, e.g. Static Link Library (SLL), Dynamic Link Library (DLL), tree, etc., the memory address tracing information of the heap allocated objects is extracted as described previously and with further trace analysis also the sequences of accesses belonging to the DDT's identified elements are extracted. These sequences are the access patterns exposed by the DDT. Through off-line analysis a knowledge base of known DDTs access patterns would be available to train a classifier acceding to that pattern. This classifier would be then used during actual run-time in order to identify the type of the unknown DDT, defined by the set of equally sized heap objects.

The refinement of the DDT at the object code is, in the general case in which DDT functions are not from STL, focused on reallocating the elements of a DDT on memory addresses in order to enhance data locality and exploit the estimated access pattern. In case of STL based DDTs, i.e. DDTs with a priori known interface API, a customization methodology defined in the above-mentioned paper by Baloukas et al can be applied in a straightforward manner, following the same steps as in the case of custom DMM at the object code level, i.e. with specific code injection to customize the implementation and data placement decisions of STL's insert, remove, move function calls).

While the disclosure has been illustrated and described in detail in the drawings and foregoing description, such illustration and description are to be considered illustrative or exemplary and not restrictive. The foregoing description details certain embodiments of the disclosure. It will be appreciated, however, that no matter how detailed the foregoing appears in text, the disclosure may be practiced in many ways. The disclosure is not limited to the disclosed embodiments.

Other variations to the disclosed embodiments can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims.

The mere fact that certain measures are recited in mutually different dependent claims does not indicate that a combination of these measures cannot be used. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. Memory hierarchy for a system-in-package, the memory hierarchy being directly connectable to a processor via a memory management unit configured to translate a virtual address sent by the processor into a physical address, the memory hierarchy having a data cache memory and a memory structure, the memory structure having at least a level 1 (L1) memory array comprising at least one cluster having one or more banks of scratchpad memory,
   wherein the memory management unit is configured for a page allocation strategy with at least two page sizes determined based on at least one page size bit, and where deciding on which page size to use is based on profiling of an object code and binary code by the data access controller, the profiling comprising an analysis of a number of accesses to a stack frame per function invocation, frame size and time between consecutive function calls,
   wherein the memory hierarchy comprises a first data access controller configured to manage one or more of the banks of scratchpad memory of at least one of the clusters of the L1 memory array, comprising a data port configured to receive at least one physical address and configured to check at run time, for each received physical address, bits of the received physical address to see whether the physical address is present in the one or more banks of the at least one cluster of the L1 memory array and, if so, as a part of the managing, to forward a data request to one or more banks of scratchpad memory where the physical address is required, and if not, to forward the physical address to a cache controller configured to steer the data cache memory.

2. The memory hierarchy for a system-in-package as in claim 1, wherein the memory structure further comprises a level 2 (L2) memory array comprising at least one cluster having one or more banks of scratchpad memory.

3. The memory hierarchy for a system-in-package as in claim 2, wherein the memory structure further comprises a second data access controller configured to manage one or more of the banks of at least one of the clusters of the L2 memory array, comprising a second data port configured to receive at least one physical address from the first data access controller and configured to check, for each received physical address, whether the physical address is present in the one or more banks of the at least one cluster of the L2 memory array and, if so, to forward a data request to one or more banks of the L2 memory array where the physical address is required.

4. The memory hierarchy for a system-in-package as in claim 3, wherein the memory structure further comprises a level 3 (L3) memory array comprising at least one cluster having one or more banks of scratchpad memory.

5. The memory hierarchy for a system-in-package as in claim 4, wherein the memory structure further comprises a third data access controller configured to manage one or more of the banks of at least one of the clusters of the L3 memory array, comprising a third data port configured to receive at least one physical address from the second data access controller and configured to check, for each received physical address, whether the physical address is present in the one or more banks of the at least one cluster of the L3 memory array and, if so, to forward a data request to one or more banks of the L3 memory array where the physical address is required.

6. The memory hierarchy for a system-in-package as in claim 5, wherein the checking comprises checking to which physical address range the at least one physical address belongs and checking to which of the one or more banks the physical address range belongs.

7. The memory hierarchy for a system-in-package as in claim 1, comprising a heap data controller configured to perform heap data management by profiling at design time object code of an application running on the processor to obtain profiling information, the profiling information comprising one or more pieces of information on a number of accesses to heap data structures, on allocated sizes, on pointer addresses, on memory footprint or fragmentation, the heap data controller further configured to identify and link data block allocation with dynamic data types in the application, injecting application specific dynamic memory managers at object code level for the dynamic data types.

8. The memory hierarchy for a system-in-package as in claim 1, wherein the heap data controller is configured to perform the heap data management at an execution time of the application.

9. The memory hierarchy for a system-in-package as in claim 1, wherein the heap data controller is configured to perform dynamic data type refinement based on the object code by identifying dynamic data types for the object code and modify the identified dynamic data types by reallocating elements of the identified dynamic data types.

10. The memory hierarchy for a system-in-package as in claim 1, wherein the heap data controller is configured to make a run-time prediction of which are most frequently accessed data elements based on predictive models trained at design time and to use the run-time prediction for reallocating heap data.

11. Memory hierarchy for a system-in-package, the memory hierarchy being directly connectable to a processor via a memory management unit configured to translate a virtual address sent by the processor into a physical address, the memory hierarchy having a data cache memory and a memory structure, the memory structure having at least a level 1 (L1) memory array comprising at least one cluster having one or more banks of scratchpad memory,
   wherein the memory hierarchy comprises a first data access controller configured to manage one or more of the banks of scratchpad memory of at least one of the clusters of the L1 memory array, comprising a data port configured to receive at least one physical address and configured to check at run time, for each received physical address, bits of the received physical address to see whether the physical address is present in the one or more banks of the at least one cluster of the L1 memory array and, if so, as a part of the managing, to forward a data request to one or more banks of scratchpad memory where the physical address is required, and if not, to forward the physical address to a cache controller configured to steer the data cache memory, wherein the memory structure further comprises a level 2 (L2) memory array comprising at least one cluster having one or more banks of scratchpad memory, wherein the memory structure further comprises a second data access controller configured to manage one or more of the banks of at least one of the clusters of the L2 memory array, comprising a second data port configured to receive at least one physical address from the first data access controller and configured to check, for each received physical address, whether the physical address is present in the one or more banks of the at least one cluster of the L2 memory array and, if so, to forward a data request to one or more banks of the L2 memory array where the physical address is required, wherein the memory hierarchy further comprises the memory management unit, wherein the memory management unit is configured for a page allocation strategy with at least two page sizes determined based on at least one page size bit, and where deciding on which page size to use is based on profiling of an object code and binary code by the data access controller, the profiling comprising an analysis of a number of accesses to a stack frame per function invocation, frame size and time between consecutive function calls.

12. The memory hierarchy for a system-in-package as in claim 11, wherein the memory structure further comprises a level 3 (L3) memory array comprising at least one cluster having one or more banks of scratchpad memory.

13. The memory hierarchy for a system-in-package as in claim 12, wherein the memory structure further comprises a third data access controller configured to manage one or more of the banks of at least one of the clusters of the L3 memory array, comprising a third data port configured to receive at least one physical address from the second data access controller and configured to check, for each received physical address, whether the physical address is present in the one or more banks of the at least one cluster of the L3 memory array and, if so, to forward a data request to one or more banks of the L3 memory array where the physical address is required.

14. The memory hierarchy for a system-in-package as in claim 11, comprising a heap data controller configured to perform heap data management by profiling at design time object code of an application running on the processor to obtain profiling information, the profiling information comprising one or more pieces of information on a number of accesses to heap data structures, on allocated sizes, on pointer addresses, on memory footprint or fragmentation, the heap data controller further configured to identify and link data block allocation with dynamic data types in the application, injecting application specific dynamic memory managers at object code level for the dynamic data types.

15. The memory hierarchy for a system-in-package as in claim 14, wherein the heap data controller is configured to perform the heap data management at an execution time of the application.

* * * * *